US012754569B2

(12) United States Patent
Otaki et al.

(10) Patent No.: US 12,754,569 B2
(45) Date of Patent: Oct. 6, 2026

(54) TRAVEL CONTROL DEVICE

(71) Applicant: MITSUBISHI HEAVY INDUSTRIES, LTD., Tokyo (JP)

(72) Inventors: Yusuke Otaki, Tokyo (JP); Kazuma Otaka, Tokyo (JP); Ei Onogawa, Tokyo (JP); Tetsuhei Kobayashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 19/130,396

(22) PCT Filed: Sep. 25, 2023

(86) PCT No.: PCT/JP2023/034668

§ 371 (c)(1),
(2) Date: May 15, 2025

(87) PCT Pub. No.: WO2024/106012

PCT Pub. Date: May 23, 2024

(65) Prior Publication Data

US 2026/0186512 A1 Jul. 2, 2026

(30) Foreign Application Priority Data

Nov. 17, 2022 (JP) ................................ 2022-184021

(51) Int. Cl.
*G05D 1/83* (2024.01)
*B66F 9/06* (2006.01)
(Continued)

(52) U.S. Cl.
CPC ............... *G05D 1/83* (2024.01); *B66F 9/063* (2013.01); *G05D 2105/28* (2024.01); *G05D 2107/70* (2024.01)

(58) Field of Classification Search
USPC ........................................................... 701/50
See application file for complete search history.

(56) References Cited

U.S. PATENT DOCUMENTS 7,568,547 B2 * 8/2009 Yamada .............. B66F 9/07572 180/282
2012/0107077 A1 * 5/2012 Alveteg .................... B66F 9/24 414/667
2017/0036898 A1 * 2/2017 Goncalves ............ B66F 17/003

FOREIGN PATENT DOCUMENTS

JP 2001-163597 A 6/2001

OTHER PUBLICATIONS

International Search Report for International Application No. PCT/JP2023/034668, dated Oct. 24, 2023, with English translation.

(Continued)

*Primary Examiner* — Adam D Tissot
(74) *Attorney, Agent, or Firm* — Birch, Stewart, Kolasch & Birch, LLP

(57) ABSTRACT

A travel control device of a forklift according to the present disclosure detects a center-of-gravity position of the forklift including a cargo when the cargo is placed on a fork, acquires correspondence relationship information in which a lifting height indicating a position of the fork in a vertical direction, a reach length indicating a protrusion amount of the fork in a traveling direction, and an acceleration for positioning a zero moment point in a stable region are associated with each other, based on the center-of-gravity position, acquires the lifting height and the reach length, acquires an allowable acceleration from the correspondence relationship information based on the lifting height and the reach length that are acquired, acquires a target reach length from the correspondence relationship information based on the lifting height and a maximum acceleration when the allowable acceleration is less than the maximum accelera- (Continued)

tion, drives the cargo handling device such that the reach length is the target reach length, and accelerates the forklift at an acceleration greater than the allowable acceleration when the reach length is the target reach length.

3 Claims, 11 Drawing Sheets

(51) Int. Cl.

| | |
|---|---|
| *G05D 105/28* | (2024.01) |
| *G05D 107/70* | (2024.01) |

(56) References Cited

OTHER PUBLICATIONS

Written Opinion of the International Searching Authority for International Application No. PCT/JP2023/034668, dated Oct. 24, 2023, with English translation.

* cited by examiner

TRAVEL CONTROL DEVICE

TECHNICAL FIELD

The present disclosure relates to a travel control device. Priority is claimed on Japanese Patent Application No. 2022-184021, filed Nov. 17, 2022, the content of which is incorporated herein by reference.

BACKGROUND ART

For example, Patent Document 1 discloses a travel control device of a forklift, which calculates an allowable acceleration based on a lifting height detected by a lifting height detector and a load detected by a load detector. In the travel control device, the actual acceleration is controlled based on the allowable acceleration to suppress the forklift from falling down.

CITATION LIST

Patent Document

Patent Document 1: Japanese Unexamined Patent Application, First Publication No. 2001-163597

SUMMARY OF INVENTION

Technical Problem

By the way, in the travel control device disclosed in Patent Document 1, the actual acceleration is constrained by the allowable acceleration corresponding to the load. In a logistics facility or the like in which a forklift operates, the higher the acceleration of the forklift, that is, the movement speed of the forklift, the higher the throughput (the loading and unloading capacity of the forklift) may be. Therefore, there is a demand for a technology capable of improving the throughput while the forklift is suppressed from falling down.

The present disclosure has been made in order to solve the above-described problems, and an object of the present disclosure is to provide a travel control device capable of improving a throughput while a forklift is suppressed from falling over.

Solution to Problem

In order to solve the aforementioned objects, according to the present disclosure, there is provided a travel control device of a forklift including a vehicle, a drive wheel that is provided on the vehicle and that causes the vehicle to travel by being driven, a straddle leg that is provided on the vehicle and is configured to travel together with the vehicle, and a cargo handling device that is provided on the straddle leg and is driven such that a fork is configured to ascend and descend in a vertical direction and configured to move forward and backward in a traveling direction of the vehicle, the movement control device including a center-of-gravity position detection unit configured to detect a center-of-gravity position of the forklift including a cargo when the cargo is placed on the fork, a correspondence relationship information acquisition unit configured to acquire correspondence relationship information in which a lifting height indicating a position of the fork in the vertical direction, a reach length indicating a protrusion amount of the fork in the traveling direction, and an acceleration for positioning a zero moment point in a stable region are associated with each other, based on the center-of-gravity position, a cargo handling device information acquisition unit configured to acquire the lifting height and the reach length of the fork, an allowable acceleration acquisition unit configured to acquire an allowable acceleration from the correspondence relationship information based on the lifting height and the reach length acquired by the cargo handling device information acquisition unit, a target reach length acquisition unit configured to acquire a target reach length from the correspondence relationship information based on the lifting height and a maximum acceleration when the allowable acceleration is less than the maximum acceleration of the forklift, a cargo handling device drive unit configured to drive the cargo handling device such that the reach length of the fork is the target reach length, and a drive wheel control unit configured to drive the drive wheel such that the forklift is accelerated at an acceleration greater than the allowable acceleration when the reach length of the fork is the target reach length.

In addition, according to the present disclosure, there is provided a travel control device of a forklift including a vehicle, a drive wheel that is provided on the vehicle and that causes the vehicle to travel by being driven, a straddle leg that is provided on the vehicle and is configured to travel together with the vehicle, and a cargo handling device that is provided on the straddle leg and is driven such that a fork is configured to ascend and descend in a vertical direction and configured to move forward and backward in a traveling direction of the vehicle, the travel control device including a center-of-gravity position detection unit configured to detect a center-of-gravity position of the forklift including a cargo when the cargo is placed on the fork, a correspondence relationship information acquisition unit configured to acquire correspondence relationship information in which a lifting height indicating a position of the fork in the vertical direction, a reach length indicating a protrusion amount of the fork in the traveling direction, and an acceleration for positioning a zero moment point in a stable region are associated with each other, based on the center-of-gravity position, a cargo handling device information acquisition unit configured to acquire the lifting height of the fork when the center-of-gravity position of the forklift is detected, a target reach length acquisition unit configured to acquire a target reach length from the correspondence relationship information based on the lifting height of the fork and a maximum acceleration of the forklift acquired by the cargo handling device information acquisition unit, a cargo handling device drive unit configured to drive the cargo handling device such that the reach length of the fork is the target reach length, an allowable acceleration acquisition unit configured to acquire an allowable acceleration from the correspondence relationship information based on the lifting height of the fork and the target reach length, and a drive wheel control unit configured to drive the drive wheel such that the forklift is accelerated at the allowable acceleration when the reach length of the fork is the target reach length.

Advantageous Effects of Invention

According to the present disclosure, it is possible to provide a travel control device capable of improving a throughput while the forklift is suppressed from falling over.

DESCRIPTION OF EMBODIMENTS

Hereinafter, a movement control system including a travel control device according to an embodiment of the present disclosure will be described with reference to the drawings.

First Embodiment

[Movement Control System]

The movement control system is a system that controls movement of a moving object. For example, the movement control system in the present embodiment controls the movement of a forklift as a moving object that performs cargo handling work such as loading and unloading and transportation of a cargo in a logistics facility such as a logistics center or a warehouse.

Figure 1:
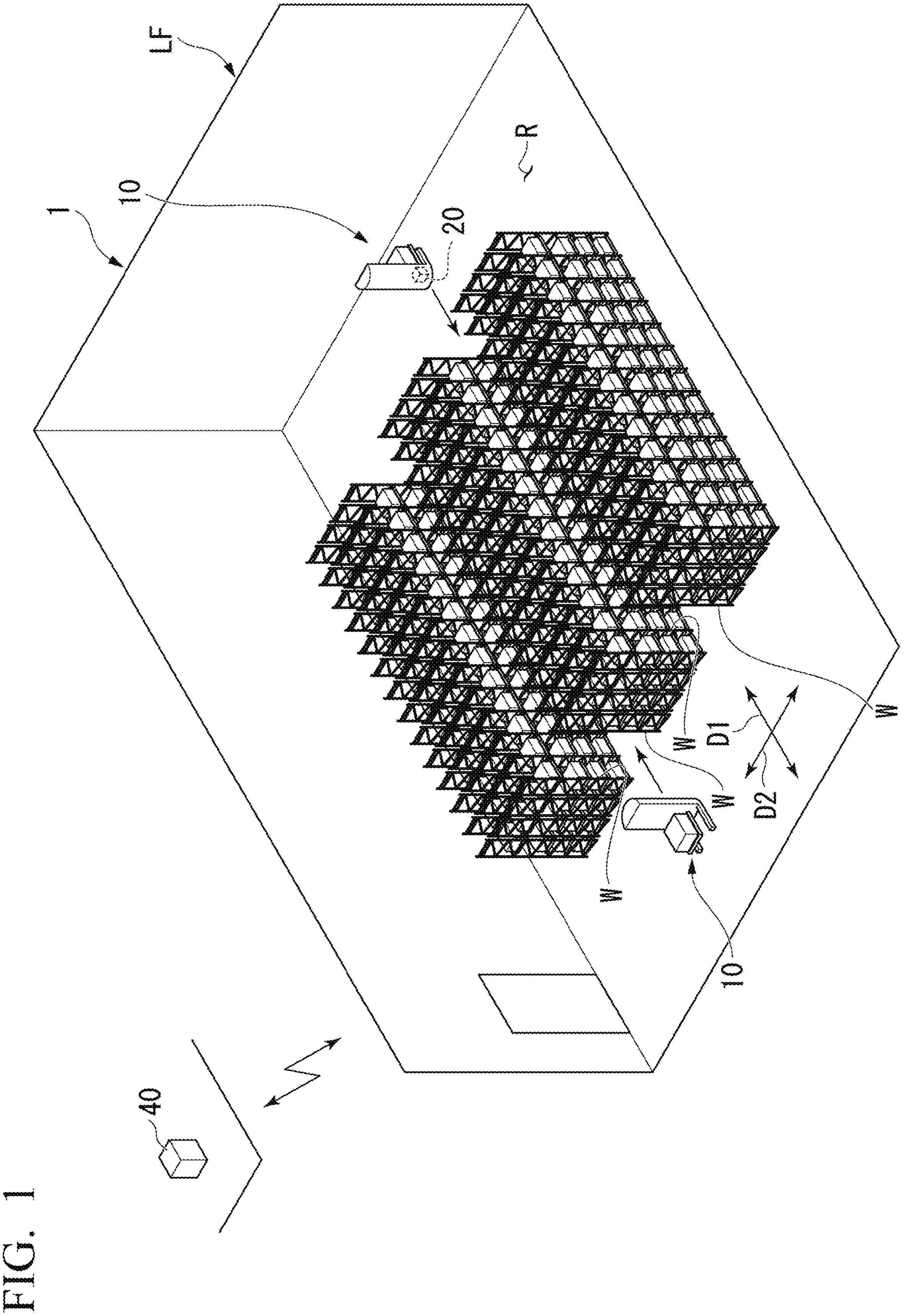
FIG. 1 A perspective diagram representing an overall configuration of a movement control system according to an embodiment of the present disclosure.

Here, as represented in FIG. 1, a forklift 10 in the present embodiment passes through a passage when the cargo is moved from a predetermined position to a target position in a logistics facility LF. The passage is interposed between a pair of wall bodies W facing each other and extends in one direction.

As the wall body W in the present embodiment, for example, a rack or the like on which a plurality of cargos or the like are placed can be exemplary examples. Hereinafter, the one direction in which the passage extends is referred to as a "passage extension direction D1", and the width direction of the passage, which is a direction in which the pair of wall bodies W face each other, is referred to as a "passage width direction D2". The passage extension direction D1 and the passage width direction D2 in the present embodiment are directions orthogonal to each other.

The movement control system 1 includes the forklift 10, a travel control device 20, and a higher-level apparatus 40.

(Forklift)

The forklift 10 is an industrial vehicle that moves a cargo placed on a pallet within the logistics facility LF. The forklift 10 in the present embodiment is a vehicle that autonomously travels in accordance with a command received from the higher-level apparatus 40. The forklift 10 is, for example, a reach-type automated guided forklift (AGF).

Figure 2:
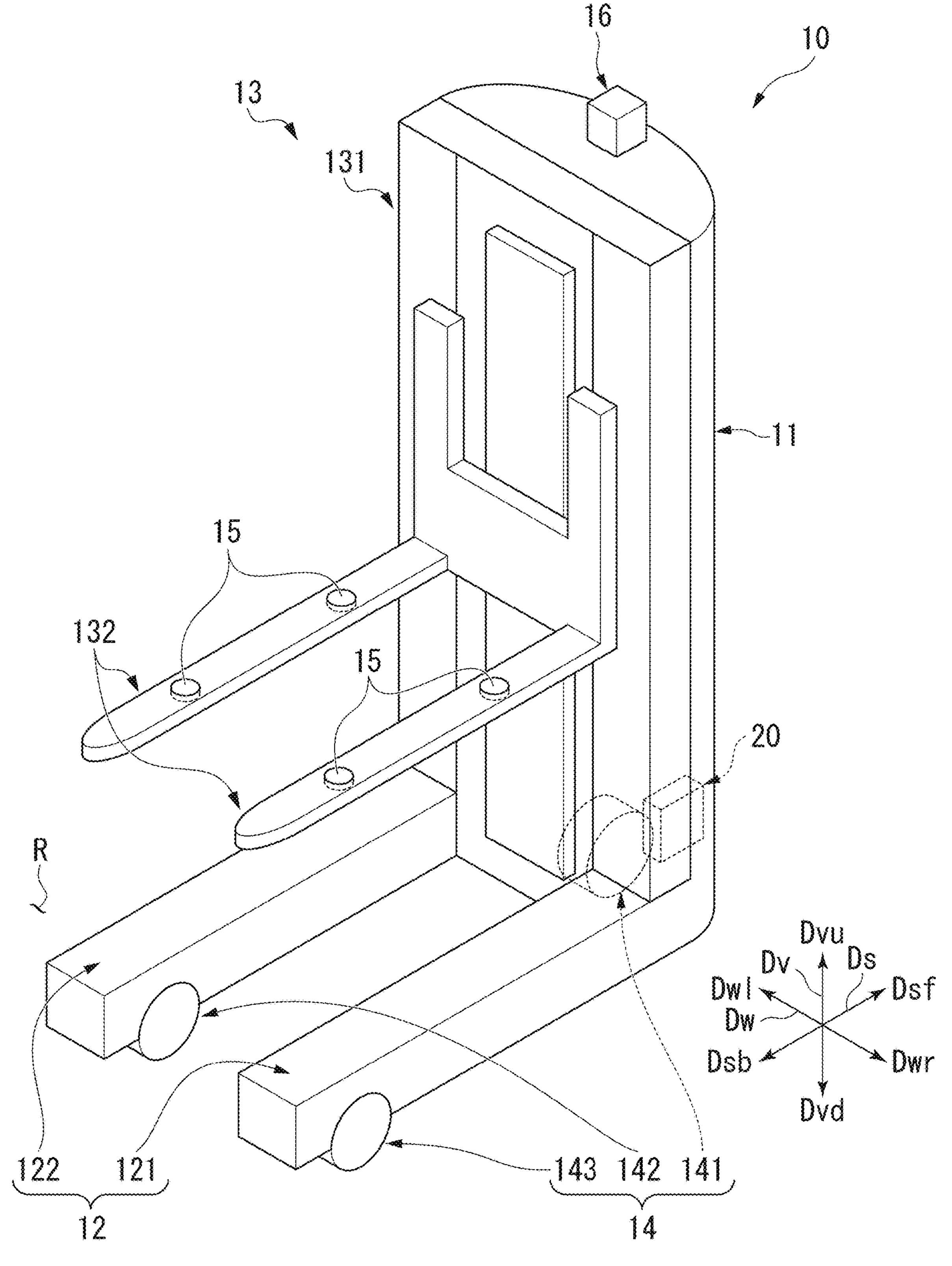
FIG. 2 A perspective diagram representing the configuration of a forklift according to a first embodiment of the present disclosure.

As represented in FIG. 2, the forklift 10 in the present embodiment includes a vehicle 11, a straddle leg 12, a cargo handling device 13, a travel mechanism 14, a weight sensor 15, and a self-position sensor 16.

(Vehicle)

The vehicle 11 is a body portion of the forklift 10 and travels on a road surface R in the logistics facility LF by the travel mechanism 14. Hereinafter, for convenience of description, a direction in which the vehicle 11 travels (a direction in which the vehicle 11 moves forward and backward) is referred to as a "traveling direction Ds". Furthermore, of two sides in the traveling direction Ds, a side of traveling forward will be referred to as a "forward side Dsf" and the opposite side thereto, of traveling backward, will be referred to as a "backward side Dsb".

In addition, the width direction of the vehicle 11 is referred to as a "vehicle width direction Dw". Furthermore, of both sides in the vehicle width direction Dw, a right side when the vehicle 11 is viewed from the backward side Dsb is referred to as a "first side Dwr", and an opposite side (left side) thereof is referred to as a "second side Dwl".

(Straddle Leg)

The straddle leg 12 is provided integrally with the vehicle 11 at a portion on the backward side Dsb and a downward side of the vehicle 11. The straddle leg 12 is a pair of shaft-shaped members extending to the backward side Dsb from the vehicle 11. A pair of straddle legs 12 are disposed in a state of being spaced apart from each other in the vehicle width direction Dw.

Hereinafter, of the pair of straddle legs 12, the straddle leg 12 disposed on the first side Dwr is referred to as a "right straddle leg 121", and the straddle leg 12 disposed on the opposite side (the second side Dwl) is referred to as a "left straddle leg 122".

(Cargo Handling Device)

The cargo handling device 13 is a portion on which the cargo is placed in the forklift 10. The cargo handling device 13 is provided on the straddle leg 12. The cargo handling device 13 includes a mast 131 and a fork 132.

The mast 131 extends in a vertical direction Dv that coincides with a vertical direction from the straddle leg 12 and is provided to be movable in the traveling direction Ds on the straddle leg 12. Hereinafter, for convenience of description, a downward side (a direction in which gravity acts) in the vertical direction Dv will be simply referred to as a "downward side Dvd", and an opposite side (an upward side) thereof will be simply referred to as an "upward side Dvu".

The mast 131 is attached to extend over both the right straddle leg 121 and the left straddle leg 122, and extends from each of the right straddle leg 121 and the left straddle leg 122 to the upward side Dvu. The mast 131 is driven to move forward and backward in the traveling direction Ds along a direction in which the right straddle leg 121 and the left straddle leg 122 extend. Specifically, for example, the entire mast 131 is moved in the traveling direction Ds when a reach mechanism (not represented) provided on the mast 131 is driven.

In addition, the mast 131 can be inclined to the forward side Dsf on the straddle leg 12 by being driven. Specifically, for example, the entire mast 131 is inclined to the forward side Dsf by driving a tilt mechanism (not represented) provided in the mast 131. The term "inclination to the forward side Dsf" here means a state in which the mast 131 is inclined such that an end portion of the mast 131 on the upward side Dvu is disposed to the forward side Dsf with respect to an end portion of the mast 131 on the downward side Dvd.

A pair of forks 132 is provided in the mast 131 in a state of extending to the backward side Dsb from the mast 131. The pair of forks 132 is disposed in a state of being spaced apart from each other in the vehicle width direction Dw. The pair of forks 132 is attached to the mast 131 to be movable in the vertical direction Dv. The pair of forks 132 is raised and lowered in the vertical direction Dv along the mast 131 when the mast 131 is driven. Specifically, for example, the entire fork 132 is moved in the vertical direction Dv when a lift mechanism (not represented) provided on the mast 131 is driven.

Therefore, the fork 132 is inserted into, for example, a fork pocket of a pallet on which a cargo is placed when the mast 131 moves in the vertical direction Dv on the straddle leg 12 and moves to the backward side DsB. The fork 132 is inserted into the fork pocket, and thus can lift the cargo placed integrally with the pallet on the pallet can be lifted together with the pallet.

Hereinafter, for convenience of description, both the pallet and the cargo placed on the pallet are collectively referred to as a "cargo Lg" (see FIG. 3). In addition, the fork 132 is in a state of being inclined with respect to a horizontal plane together with the cargo Lg in a state where the cargo Lg is placed when the mast 131 is inclined on the forward side Dsf on the straddle leg 12.

Hereinafter, when the mast 131 is driven, the advance and retraction movement of the mast 131 in the traveling direction Ds together with the fork 132 is referred to as a "reach operation". In addition, in the reach operation, the movement of the mast 131 to the backward side Dsb is referred to as "reach-out", and the movement of the mast 131 to the forward side Dsf is referred to as "reach-in".

In addition, when the mast 131 is driven, the lifting and lowering of the fork 132 in the vertical direction Dv is referred to as a "lift operation". In addition, in the lift operation, the movement of the fork 132 to the upward side Dvu is referred to as "lift-up", and the movement of the fork 132 to the downward side Dvd is referred to as "lift-down".

In addition, when the mast 131 is driven, the operation of tilting the fork 132 with respect to the horizontal plane is referred to as a "tilt operation". In the tilt operation, the inclination of the fork 132 to the forward side Dsf with respect to the horizontal plane is referred to as "tilt-up", and the return of the fork 132 to the original position from a state where the fork 132 is inclined to the forward side Dsf is referred to as "tilt-down". The term "inclination to the forward side Dsf with respect to the horizontal plane" here means a state in which the pair of forks 132 is inclined such that the end portions of the pair of forks 132 on the backward side Dsb are disposed to the upward side Dvu with respect to the end portions of the pair of forks 132 on the forward side Dsf.

In addition, the mast 131 transmits the lifting height indicating the position of the fork 132 in the vertical direction Dv and the reach length indicating the protrusion amount of the fork 132 in the traveling direction Ds, to the travel control device 20. The lifting height indicating the position of the fork 132 in the vertical direction Dv means a height in the vertical direction Dv from a position when the fork 132 is disposed at the most downward side Dvd. In addition, the protrusion amount of the fork 132 in the traveling direction Ds means a protrusion amount in the traveling direction Ds from a position when the fork 132 is disposed at the most forward side Dsf.

(Travel Mechanism)

The travel mechanism 14 supports the vehicle 11 and the straddle leg 12 from the downward side Dvd in the vertical direction Dv and allows the vehicle 11 and the straddle leg 12 to be movable on the road surface R.

Figure 3:
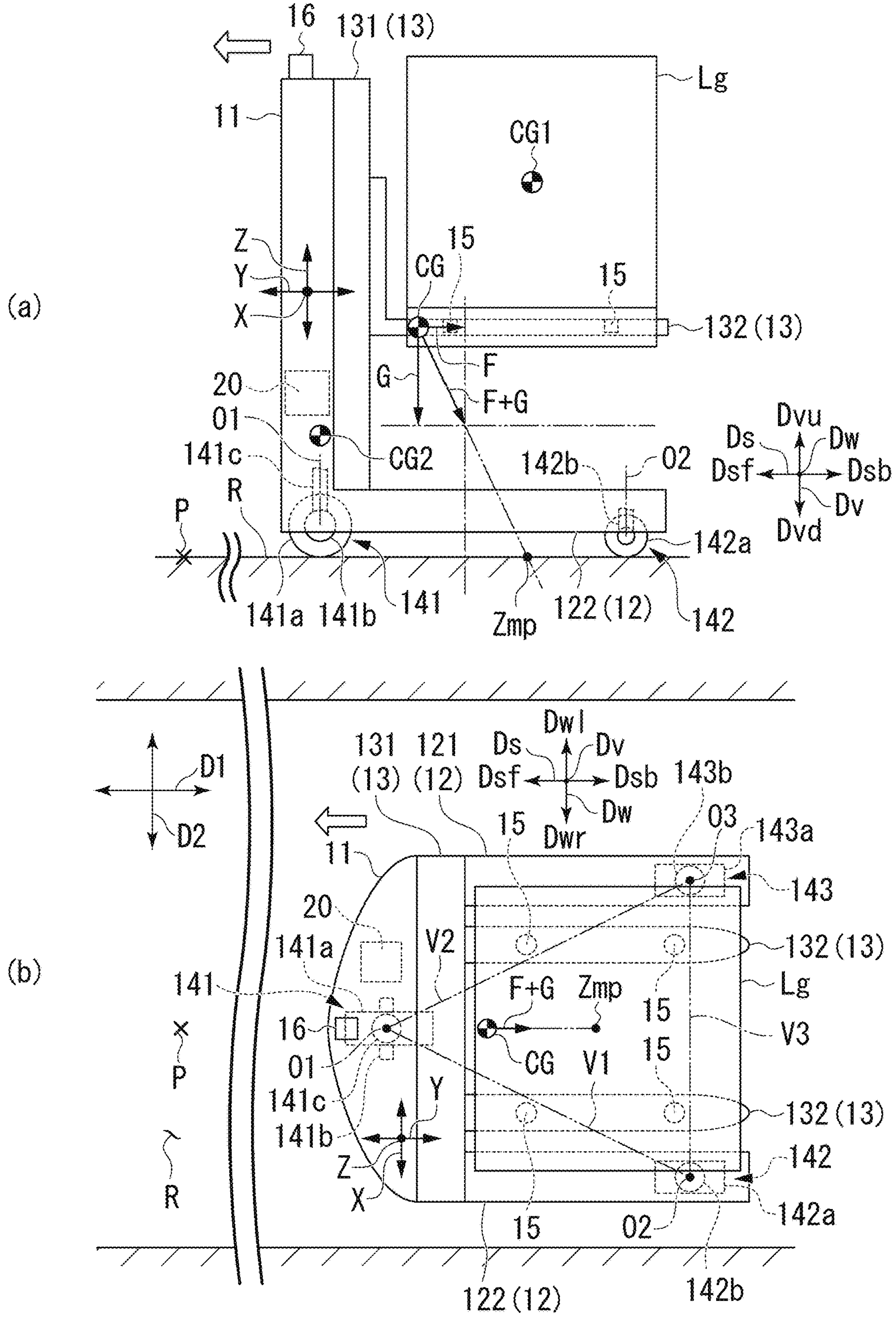
FIG. 3 A conceptual diagram showing a zero moment point according to the first embodiment of the present disclosure.

As represented in FIGS. 2 and 3, the travel mechanism 14 in the present embodiment has a drive wheel 141, a first driven wheel 142, and a second driven wheel 143.

The drive wheel 141 is provided in the vehicle 11. As represented in FIG. 3, the drive wheel 141 includes a drive wheel main body **141*a* that can rotate while abutting on the road surface R, a drive motor 141*b* that rotates the drive wheel main body 141*a* in a state where the drive wheel main body 141*a* abuts on the road surface R, and a steering motor 141*c* that can turn the orientation of the drive wheel main body 141*a*. The drive motor 141*b* and the steering motor 141*c* are connected to, for example, the drive wheel main body 141*a***.

The drive motor **141*b* rotates based on a signal indicating a driving instruction transmitted from the travel control device 20. Specifically, the drive motor 141*b* receives a signal indicating a torque (rotation speed) from the travel control device 20 and rotates the drive wheel main body 141*a* by rotating itself based on the torque. The steering motor 141*c* is rotationally movable about a first rotation axis line O1 extending in the vertical direction Dv. The first rotation axis line O1 in the present embodiment, for example, extends in the vertical direction Dv to penetrate the center of the drive wheel 141. The steering motor 141*c*, for example, steers the drive wheel main body 141*a* based on a signal indicating a steering instruction transmitted from the travel control device 20**.

Specifically, the steering motor **141*c* receives a signal indicating the rotation angle from the travel control device 20 and thus sets its own posture to the rotation angle. That is, the inclination of the drive wheel main body 141*a* with respect to the traveling direction Ds is adjusted as the steering motor 141*c* rotates, and as a result, the orientation of the drive wheel main body 141*a*** is turned.

The first driven wheel 142 is provided at an end portion of the left straddle leg 122 on the backward side Dsb. The first driven wheel 142 includes, for example, a first driven wheel main body **142*a* that can be rotated while abutting on the road surface R, and a steering motor 142*b* that can turn the orientation of the first driven wheel main body 142*a*. The steering motor 142*b* is connected to, for example, the first driven wheel main body 142*a*. The steering motor 142*b* is rotationally movable about a second rotation axis line O2 extending in the vertical direction Dv. The second rotation axis line O2 in the present embodiment, for example, extends in the vertical direction Dv to penetrate the center of the first driven wheel 142. The steering motor 142*b*, for example, steers the first driven wheel main body 142*a* based on a signal indicating a steering instruction transmitted from the travel control device 20**.

Specifically, the steering motor **142*b* receives a signal indicating the rotation angle from the travel control device 20 and thus sets its own posture to the rotation angle. That is, the inclination of the first driven wheel main body 142*a* with respect to the traveling direction Ds is adjusted as the steering motor 142*b* rotates, and as a result, the orientation of the first driven wheel main body 142*a*** is turned.

The second driven wheel 143 is provided at an end portion of the right straddle leg 121 on the backward side Dsb. The second driven wheel 143 includes, for example, a second driven wheel main body 143*a* that can rotate while abutting on the road surface R, and a steering motor 143*b* that can turn the orientation of the second driven wheel main body 143*a*. The steering motor 143*b* is connected to, for example, the second driven wheel main body 143*a*. The steering motor 143*b* is rotationally movable about a third rotation axis line O3 extending in the vertical direction Dv. The third rotation axis line O3 in the present embodiment, for example, extends in the vertical direction Dv to penetrate the center of the second driven wheel 143. The steering motor 143*b*, for example, steers the second driven wheel main body 143*a* based on a signal indicating a steering instruction transmitted from the travel control device 20.

Specifically, the steering motor 143*b* receives a signal indicating the rotation angle from the travel control device 20 and thus sets its own posture to the rotation angle. That is, the inclination of the second driven wheel main body 143*a* with respect to the traveling direction Ds is adjusted as the steering motor 143*b* rotates, and as a result, the orientation of the second driven wheel main body 143*a* is turned.

Here, in the present embodiment, an imaginary triangle is formed when viewed in the vertical direction Dv by a first imaginary line V1 connecting the first rotation axis line O1 and the second rotation axis line O2, a second imaginary line V2 connecting the first rotation axis line O1 and the third rotation axis line O3, and a third imaginary line V3 connecting the second rotation axis line O2 and the third rotation axis line O3. The triangle forms, for example, an isosceles triangle shape in which the length of the first imaginary line V1 and the length of the second imaginary line V2 are equal when viewed in the vertical direction Dv.

That is, a distance (a length of the first imaginary line V1) between the first rotation axis line O1 and the second rotation axis line O2 in the two-dimensional plane coordinate system constituted with the passage extension direction D1 and the passage width direction D2 is equal to a distance (a length of the second imaginary line V2) between the first rotation axis line O1 and the third rotation axis line O3. In the present embodiment, a distance (a length of the third imaginary line V3) between the second rotation axis line O2 and the third rotation axis line O3 is shorter than the length of the first imaginary line V1 and the length of the second imaginary line V2.

(Weight Sensor)

The weight sensor 15 is a sensor that detects the weight of the cargo Lg when the cargo Lg is placed on the fork 132. The weight sensor 15 in the present embodiment is a load cell. The weight sensor 15 acquires weight data by applying a load to itself. The weight sensor 15 transmits a signal indicating the acquired weight data to the travel control device 20.

As represented in FIGS. 2 and 3, a plurality of weight sensors 15 are provided in the fork 132. Specifically, the two weight sensors 15 are disposed on the fork 132 disposed on the first side Dwr of the pair of forks 132, and the two weight sensors 15 are disposed on the fork 132 disposed on the second side Dwl.

The weight sensors 15 provided on the respective forks 132 are disposed to be spaced apart from each other on the respective forks 132 in the traveling direction Ds. The positions of the two weight sensors 15 provided on the fork 132 disposed on the first side Dwr are aligned with the positions of the two weight sensors 15 provided on the fork 132 disposed on the second side Dwl in the traveling direction Ds.

(Self-Position Sensor)

The self-position sensor 16 in the present embodiment detects the position and the posture of an object by irradiating the periphery with laser light and detecting (receiving) reflected light from the object in the periphery. The self-position sensor 16 is, for example, a laser scanner such as a 2D-light detection and ranging (LiDAR) that scans laser light in a horizontal direction. The self-position sensor 16 is provided, for example, on a surface of the vehicle 11 that faces the upward side Dvu.

For example, when the forklift 10 travels through the passage, the self-position sensor 16 scans the laser light in the horizontal direction, and thus detects the contour of the pair of wall bodies W and the contour of the forklift 10. Specifically, the self-position sensor 16 acquires data indicating the contour of the wall body W and the contour of the forklift 10 by a plurality of plots. For example, coordinates of a two-dimensional plane coordinate system are associated with each plot of the data indicating the contour of the wall body W and the contour of the forklift 10. The self-position sensor 16 transmits a signal indicating the acquired data to the travel control device 20.

(Travel Control Device)

When the forklift 10 travels toward a target position P in the logistics facility LF, the travel control device 20 controls the travel mechanism 14 of the forklift 10 and thus controls the movement speed of the moving object (acceleration of the forklift 10 in the traveling direction Ds). The travel control device 20 is provided, for example, inside the vehicle 11 of the forklift 10.

As the term "target position P" here, for example, a plurality of locations disposed on a traveling route that is designated for the forklift 10 in advance, a position at which the forklift 10 can perform cargo handling work such as loading and unloading of the cargo Lg in a passage, or the like can be exemplary examples. The target position P is set in advance by, for example, the higher-level apparatus 40. The travel control device 20 receives a signal indicating the position of the target position P from the higher-level apparatus 40.

Figure 4:
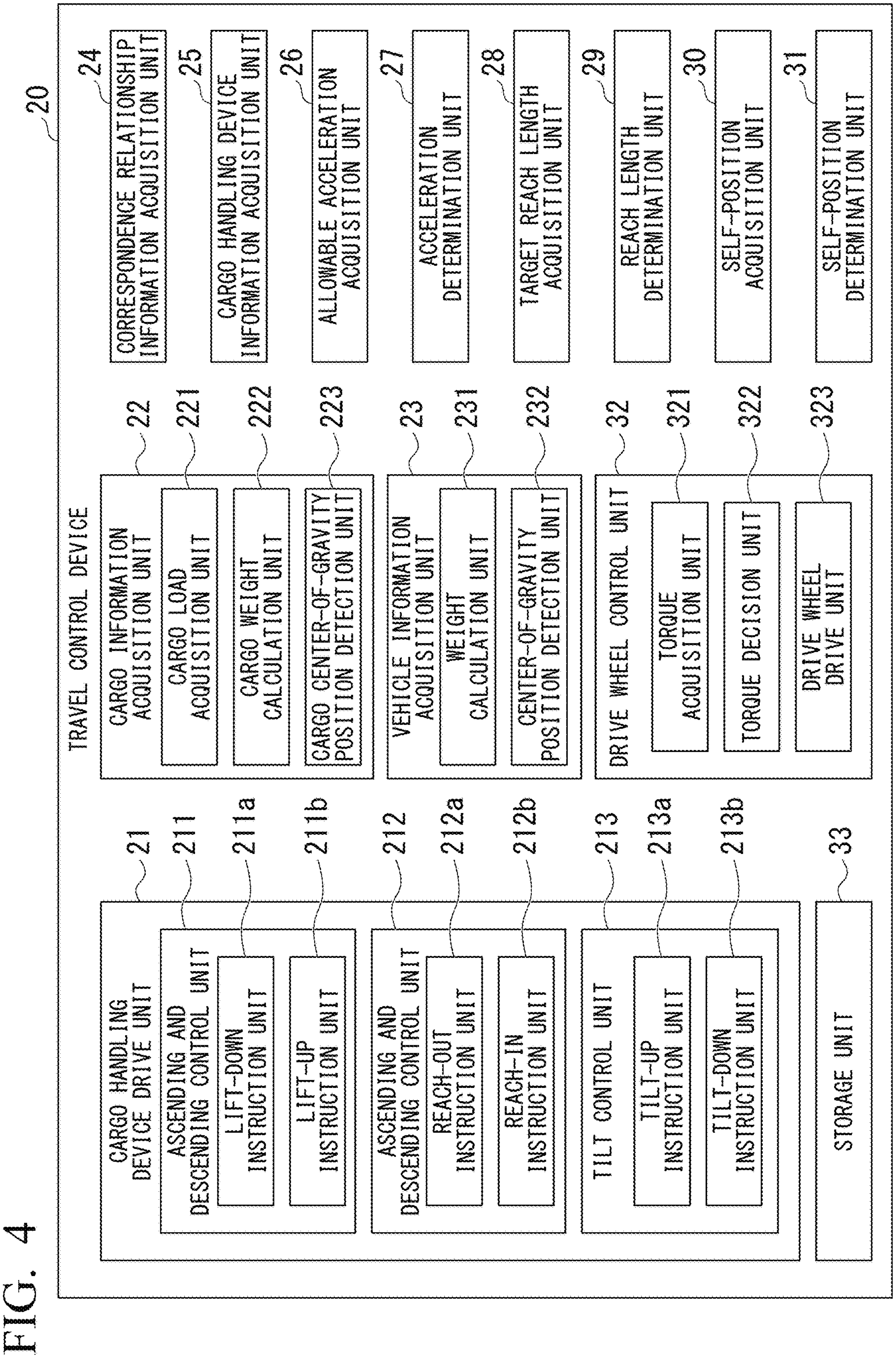
FIG. 4 A functional block diagram of a travel control device according to the first embodiment of the present disclosure.

As represented in FIG. 4, the travel control device 20 according to the present embodiment includes a cargo handling device drive unit 21, a cargo information acquisition unit 22, a vehicle information acquisition unit 23, a correspondence relationship information acquisition unit 24, a cargo handling device information acquisition unit 25, an allowable acceleration acquisition unit 26, an acceleration determination unit 27, a target reach length acquisition unit 28, a reach length determination unit 29, a self-position acquisition unit 30, a self-position determination unit 31, a drive wheel control unit 32, and a storage unit 33.

(Cargo Handling Device Drive Unit)

The cargo handling device drive unit 21 drives the mast 131 of the cargo handling device 13 and thus causes the cargo handling device 13 to perform the above-mentioned reach operation, lift operation, and tilt operation. The cargo handling device drive unit 21 in the present embodiment drives the mast 131 of the cargo handling device 13 based on the lifting height of the fork 132, the reach length of the fork 132, and the signal indicating the instruction of the tilt operation, which are received from the outside. The cargo handling device drive unit 21 includes an ascending and descending control unit 211, an advance and retraction control unit 212, and a tilt control unit 213.

The ascending and descending control unit 211 transmits a signal indicating an instruction of the lift operation to the mast 131 based on the lifting height of the fork 132 received from the outside. The ascending and descending control unit 211 in the present embodiment has a lift-down instruction unit 211*a* and a lift-up instruction unit 211*b*.

The lift-down instruction unit 211*a* transmits a signal indicating an instruction to lower the fork 132 (move to the downward side Dvd) until the received lifting height is reached, to the mast 131. When the signal from the lift-down instruction unit 211*a* is received, the mast 131 moves the fork 132 to the downward side Dvd. The lift-down instruction unit 211*a* sends a signal indicating that the lift-down is completed to the drive wheel control unit 32 after the mast 131 moves the fork 132 to the lifting height.

The lift-up instruction unit 211*b* transmits a signal indicating an instruction to raise the fork 132 (move to the upward side Dvu) until the received lifting height is reached, to the mast 131. When the signal from the lift-up instruction unit 211*b* is received, the mast 131 moves the fork 132 to the upward side Dvu. The lift-up instruction unit 211*b* sends a signal indicating that the lift-up is completed to the drive wheel control unit 32 after the mast 131 moves the fork 132 to the lifting height.

The advance and retraction control unit 212 transmits a signal indicating an instruction of the reach operation to the mast 131 based on the reach length of the fork 132 received from the outside. The advance and retraction control unit 212 in the present embodiment has a reach-out instruction unit 212*a* and a reach-in instruction unit 212*b*.

The reach-out instruction unit 212*a* transmits a signal indicating an instruction to advance the fork 132 (move to the backward side Dsb of the mast 131) until the received reach length is reached, to the mast 131. When the signal from the reach-out instruction unit 212*a* is received, the mast 131 moves the fork 132 to the backward side Dsb. The reach-out instruction unit 212*a* sends a signal indicating that the reach-out is completed to the drive wheel control unit 32 after the mast 131 moves the fork 132 to the reach length.

The reach-in instruction unit 212*b* transmits a signal indicating an instruction to retract the fork 132 (move the mast 131 to the forward side Dsf) until the received reach length is reached, to the mast 131. When the signal from the reach-in instruction unit 212*b* is received, the mast 131 moves the fork 132 to the forward side Dsf. The reach-in instruction unit 212*b* sends a signal indicating that the reach-in is completed to the drive wheel control unit 32 after the mast 131 moves the fork 132 to the reach length.

The tilt control unit 213 transmits a signal indicating an instruction of the tilt operation to the mast 131. The tilt control unit 213 in the present embodiment has a tilt-up instruction unit 213*a* and a tilt-down instruction unit 213*b*.

The tilt-up instruction unit 213*a* transmits a signal indicating an instruction to tilt the mast 131 at a predetermined angle (inclination of the mast 131 to the forward side Dsf), to the mast 131. When the signal from the tilt-up instruction unit 213*a* is received, the mast 131 causes the fork 132 to be inclined toward the forward side Dsf with respect to the horizontal plane. The tilt-up instruction unit 213*a* sends a signal indicating that the tilt-up is completed to the cargo information acquisition unit 22 after the mast 131 is inclined.

The tilt-down instruction unit 213*b* transmits a signal indicating an instruction to return the inclination to its original state, to the mast 131. When the signal from the tilt-down instruction unit 213*b* is received, the mast 131 returns the fork 132 to its original state parallel to the horizontal plane. The tilt-down instruction unit 213*b* sends a signal indicating that the tilt-down is completed to the cargo information acquisition unit 22 after the inclination of the mast 131 is returned to its original state.

(Cargo Information Acquisition Unit)

The cargo information acquisition unit 22 acquires the cargo information when the cargo handling device drive unit 21 is driven and the cargo Lg is placed on the fork 132. The cargo information in the present embodiment includes the weight of the cargo Lg and a center-of-gravity position CG1 (see (a) of FIG. 3) of the cargo Lg. The cargo information acquisition unit 22 has a cargo load acquisition unit 221, a cargo weight calculation unit 222, and a cargo center-of-gravity position detection unit 223.

The cargo load acquisition unit 221 acquires the load applied to the fork 132 from the cargo Lg placed on the fork 132. The cargo load acquisition unit 221 in the present embodiment receives the weight data transmitted from each of the weight sensors 15 provided on the fork 132. The cargo load acquisition unit 221 sends a signal indicating the weight acquired by each of the acquired weight sensors 15 to the cargo weight calculation unit 222 and the cargo center-of-gravity position detection unit 223.

The cargo weight calculation unit 222 acquires the weight of the cargo Lg by summing up each weight data received from the cargo load acquisition unit 221. That is, the cargo weight calculation unit 222 in the present embodiment acquires the weight of the cargo Lg based on the weight data acquired by the four weight sensors 15 provided on the fork 132. The cargo weight calculation unit 222 sends a signal indicating the acquired weight of the cargo Lg to the vehicle information acquisition unit 23.

The cargo center-of-gravity position detection unit 223 detects the center-of-gravity position CG1 of the cargo Lg placed on the fork 132. FIG. 3 represents an example of the center-of-gravity position CG1 of the cargo Lg in the traveling direction Ds. The cargo center-of-gravity position detection unit 223 detects the center-of-gravity position CG1 of the cargo Lg based on each weight data received from the cargo load acquisition unit 221.

Specifically, the cargo center-of-gravity position detection unit 223 detects the center-of-gravity position CG1 of the cargo Lg in the vehicle width direction Dw based on, for example, a load difference of the pair of forks 132. In addition, for example, when a signal indicating that the tilt-up is completed from the tilt-up instruction unit 213*a* in the cargo handling device drive unit 21 is received, the cargo center-of-gravity position detection unit 223 detects the center-of-gravity position CG1 of the cargo Lg in the traveling direction Ds based on the amount of change in the load before and after the tilt-up applied to the two weight sensors 15 provided in each of the forks 132. The cargo center-of-gravity position detection unit 223 sends a signal indicating the detected center-of-gravity position CG1 to the vehicle information acquisition unit 23.

(Vehicle Information Acquisition Unit)

The vehicle information acquisition unit 23 acquires vehicle information when the cargo handling device drive unit 21 is driven and the cargo Lg is placed on the fork 132. The vehicle information in the present embodiment includes the weight of the forklift 10 including the cargo Lg and a center-of-gravity position CG of the forklift 10 including the cargo Lg. The vehicle information acquisition unit 23 has a weight calculation unit 231 and a center-of-gravity position detection unit 232.

The weight calculation unit 231 acquires the total weight of the forklift 10 including the cargo Lg by summing the weight of the cargo Lg received from the cargo weight calculation unit 222 of the cargo information acquisition unit 22 and the weight of the forklift 10 stored in advance by the storage unit 33.

The center-of-gravity position detection unit 232 detects the center-of-gravity position CG of the entire forklift 10 including the cargo Lg. The center-of-gravity position detection unit 232 detects the center-of-gravity position CG of the entire forklift 10 including the cargo Lg based on the center-of-gravity position CG1 of the cargo Lg received from the cargo center-of-gravity position detection unit 223 of the cargo information acquisition unit 22 and a center-of-gravity position CG2 of the forklift 10 stored in advance by the storage unit 33.

Specifically, the center-of-gravity position detection unit 232 acquires the center-of-gravity position CG as coordinates of a three-dimensional coordinate system defined in the vehicle width direction Dw (X direction), the traveling direction Ds (Y direction), and the vertical direction Dv (Z direction). The origin in the three-dimensional coordinate system is set, for example, at a predetermined position in the vehicle 11. The center-of-gravity position detection unit 232 sends a signal indicating the acquired center-of-gravity position CG to the correspondence relationship information acquisition unit 24.

(Correspondence Relationship Information Acquisition Unit)

The correspondence relationship information acquisition unit 24 acquires the correspondence relationship information based on the center-of-gravity position CG detected by the center-of-gravity position detection unit 232 of the vehicle information acquisition unit 23. In the correspondence relationship information in the present embodiment, the lifting height of the fork 132, the reach length of the fork 132, and the acceleration for positioning a zero moment point Zmp within a stable region R1 are associated with each other.

Here, when the forklift 10 is accelerated during traveling, a resultant force vector F+G of a vector F indicating a direction and a magnitude of an inertial force applied in a direction opposite to the direction of acceleration and a vector G indicating a direction and a magnitude of gravity applied to the downward side Dvd is conceptually represented in FIG. 3.

The zero moment point Zmp in the correspondence relationship information means an intersection between a virtual extension line of the resultant force vector F+G and the road surface R. FIG. 3 represents, as an example, a case where the traveling direction Ds of the forklift 10 coincides with the passage extension direction D1 and a case where the forklift 10 travels while accelerating toward the forward side Dsf.

Figure 5:
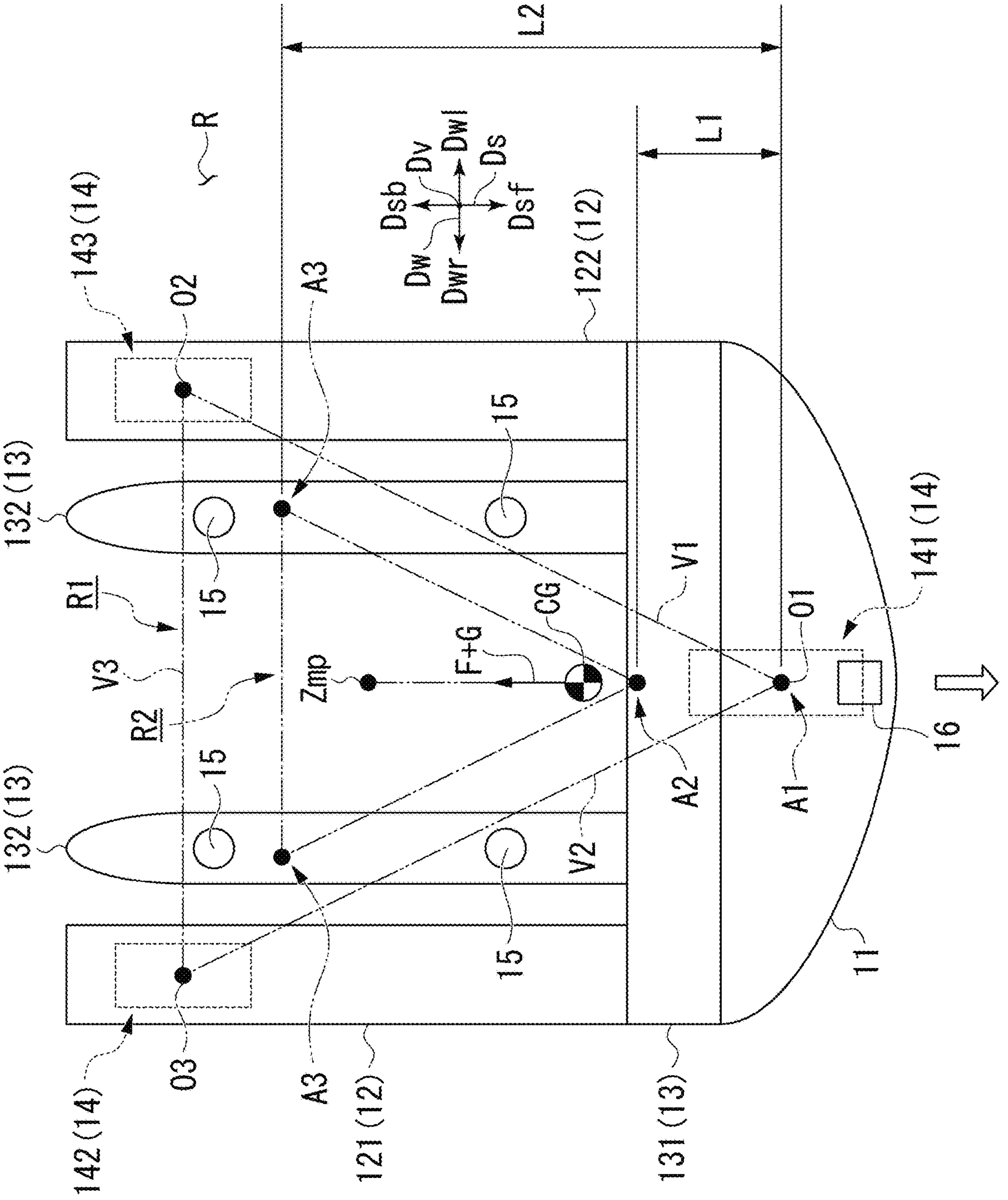
FIG. 5 A conceptual diagram showing a stable region and an allowable region according to the first embodiment of the present disclosure.

In addition, as represented in FIG. 5, the stable region R1 means a triangular region defined when an imaginary triangle formed by the first imaginary line V1, the second imaginary line V2, and the third imaginary line V3 is projected onto the road surface R when viewed from the upward side Dvu.

Therefore, the stable region R1 in the present embodiment is a region formed by connecting the first rotation axis line O1, the second rotation axis line O2, and the third rotation axis line O3 to each other on the road surface R in a straight line (represented by a two-dot chain line in FIG. 5). That is, in the stable region R1 in the present embodiment, the vertex of the triangle at which the two sides of the same length intersect is disposed to face the forward side Dsf.

In addition, in the present embodiment, an allowable region R2 that forms a triangular shape (isosceles triangle) having a relationship similar to the stable region R1 is disposed in the stable region R1. The area of the allowable region R2 is smaller than the area of the stable region R1, and the vertex of a triangle at which the two sides of the same length intersect is disposed to face the forward side Dsf.

Hereinafter, for convenience of description, the vertex of the triangle at which the two sides having the same length intersect in the stable region R1 is denoted by "A1", and the vertex of the triangle at which the two sides having the same length in the allowable region R2 is denoted by "A2". In addition, it is assumed that a vertex of the triangle other than the vertex A2 in the allowable region R2 is "A3".

The correspondence relationship information acquired by the correspondence relationship information acquisition unit 24 in the present embodiment is represented by, for example, the following Expressions (i) and (ii).

$$\alpha \geq (L1 - Yg - R \cdot Kr)/(Zg + L \cdot Kr) \tag{i}$$

$$\alpha \leq (L2 - Yg - R \cdot Kr)/(Zg + L \cdot Kr) \tag{ii}$$

Here, α of Expressions (i) and (ii) is an allowable acceleration that positions the zero moment point Zmp within the stable region R1, and is treated as a variable during the operation of the travel control device 20. The unit of the allowable acceleration α is G, and is a value obtained by dividing the acceleration by the gravitational acceleration.

L1 of Expression (i) is a distance in the traveling direction Ds from the vertex A1 of the stable region R1 to the vertex A2 of the allowable region R2, and L2 of Expression (ii) is a distance in the traveling direction Ds from the vertex A1 of the stable region R1 to the vertex A3 of the allowable region R2.

The L1 and L2 are, for example, constants set in advance at a stage in which the forklift 10 is designed. The L1 and L2, for example, are stored in advance by the storage unit 33. That is, the correspondence relationship information acquisition unit 24 acquires L1 and L2 when the correspondence relationship information acquisition unit 24 refers to the storage unit 33.

In addition, Yg in Expressions (i) and (ii) is a coordinate of the center-of-gravity position CG of the forklift 10 including the cargo Lg in the traveling direction Ds (Y direction) when the fork 132 is disposed on the most downward side Dvd and the forward side Dsf. Zg in Expressions (i) and (ii) is a coordinate of the center-of-gravity position CG of the forklift 10 including the cargo Lg in the vertical direction Dv (Z direction) when the fork 132 is disposed on the most downward side Dvd and the forward side Dsf. That is, the Yg and Zg are coordinates received by the correspondence relationship information acquisition unit 24 from the center-of-gravity position detection unit 232 of the vehicle information acquisition unit 23.

In addition, R in Expressions (i) and (ii) is a reach length indicating a protrusion amount of the fork 132 in the traveling direction Ds, and L is a lifting height indicating a position (height) of the fork 132 in the vertical direction Dv. The R and L are treated as variables during the operation of the travel control device 20.

In addition, Kr of Expressions (i) and (ii) is a value (reach mass ratio) decided by the weight of the cargo Lg, and is represented by, for example, the following expression.

$$Kr = Mr/M \quad \text{(iii)}$$

Mr is obtained by adding the weight of the cargo handling device 13 stored in advance by the storage unit 33 to the weight of the cargo Lg acquired by the cargo weight calculation unit 222. M is obtained by adding the weight of the forklift 10 stored in advance by the storage unit 33 to the weight of the cargo Lg acquired by the cargo weight calculation unit 222. That is, M is the total weight of the forklift 10 including the cargo Lg.

The correspondence relationship information acquisition unit 24 sends a signal indicating the acquired correspondence relationship information to the allowable acceleration acquisition unit 26 and the target reach length acquisition unit 28.

(Cargo Handling Device Information Acquisition Unit)

The cargo handling device information acquisition unit 25 in the present embodiment acquires the lifting height and the reach length of the fork 132 transmitted from the mast 131 when the forklift 10 travels. The cargo handling device information acquisition unit 25 sends the acquired signals indicating the lifting height and the reach length of the fork 132 to the allowable acceleration acquisition unit 26. In addition, the cargo handling device information acquisition unit 25 sends the acquired signal indicating the lifting height of the fork 132 to the target reach length acquisition unit 28.

(Allowable Acceleration Acquisition Unit)

The allowable acceleration acquisition unit 26 acquires the allowable acceleration from the correspondence relationship information acquired by the correspondence relationship information acquisition unit 24 based on the lifting height and the reach length of the fork 132 acquired by the cargo handling device information acquisition unit 25.

Specifically, the allowable acceleration acquisition unit 26 calculates the allowable acceleration as the acceleration by substituting the lifting height and the reach length of the fork 132 received from the cargo handling device information acquisition unit 25 into the correspondence relationship information represented by Expressions (i) and (ii) described above received from the correspondence relationship information acquisition unit 24.

Specifically, when the acceleration of the traveling forklift 10 is applied to the backward side Dsb, the allowable acceleration acquisition unit 26 calculates the allowable acceleration α by the following Expression (iv) indicating a case where Expression (i) described above is an equation.

$$\alpha = (L1 - Yg - R \cdot Kr)/(Zg + L \cdot Kr) \quad \text{(iv)}$$

In addition, when the acceleration of the traveling forklift 10 is applied to the forward side Dsf, the allowable acceleration acquisition unit 26 calculates the allowable acceleration α by the following Expression (v) indicating a case where Expression (ii) described above is an equation.

$$\alpha = (L2 - Yg - R \cdot Kr)/(Zg + L \cdot Kr) \quad \text{(v)}$$

The allowable acceleration acquisition unit 26 sends the calculated allowable acceleration signal to each of the acceleration determination unit 27, the target reach length acquisition unit 28, and the self-position determination unit 31.

(Acceleration Determination Unit)

The acceleration determination unit 27 determines (compares) whether or not the magnitude of the allowable acceleration received from the allowable acceleration acquisition unit 26 is smaller than the magnitude of the maximum acceleration of the forklift 10. The term "magnitude of the maximum acceleration of the forklift 10" here means, for example, a magnitude of an acceleration applied to the forklift 10 when the drive motor 141*b* is rotated with the maximum torque among the torques that can be generated by the drive wheel 141 in a state where the cargo Lg is not placed on the fork 132. The maximum acceleration is a constant (unit: G). The maximum acceleration, for example, is stored in advance by the storage unit 33. That is, the acceleration determination unit 27 acquires the maximum acceleration by referring to the storage unit 33.

When the magnitude of the allowable acceleration is smaller than the magnitude of the maximum acceleration, the acceleration determination unit 27 determines that "the allowable acceleration is less than the maximum acceleration". On the other hand, the acceleration determination unit 27 determines that "the allowable acceleration is equal to or greater than the maximum acceleration" when the magnitude of the allowable acceleration is equal to or greater than the magnitude of the maximum acceleration. The acceleration determination unit 27 sends a signal indicating the determination result to the target reach length acquisition unit 28 and the drive wheel control unit 32.

(Target Reach Length Acquisition Unit)

When the determination result indicating that "the allowable acceleration is less than the maximum acceleration" is received from the acceleration determination unit 27, the target reach length acquisition unit 28 acquires the reach length of the fork 132 corresponding to the allowable acceleration received from the allowable acceleration acquisition unit 26 from the correspondence relationship information acquired by the correspondence relationship information.

Specifically, the target reach length acquisition unit 28 calculates the target reach length as the reach length by substituting the lifting height of the fork 132 received from the cargo handling device information acquisition unit 25 and the acceleration received from the allowable acceleration acquisition unit 26 into the correspondence relationship information represented by Expressions (i) and (ii) described above received from the correspondence relationship information acquisition unit 24.

The target reach length acquisition unit 28 calculates the target reach length R by the following Expression (vi) obtained by modifying Expression (iv) described above when the acceleration of the traveling forklift 10 is applied to the backward side Dsb.

$$R = (L1 - Yg - \alpha \cdot (Zg + L \cdot Kr))/Kr \quad \text{(vi)}$$

In addition, when the acceleration of the traveling forklift 10 is applied to the backward side Dsb, the target reach length acquisition unit 28 calculates the target reach length R by the following Expression (vii) obtained by modifying Expression (v) described above.

$$R=(L2-Yg-\alpha\cdot(Zg+L\cdot Kr))/Kr \quad \text{(vii)}$$

The target reach length acquisition unit 28 sends a signal indicating the calculated target reach length to the cargo handling device drive unit 21.

(Reach Length Determination Unit)

The reach length determination unit 29 determines whether or not the reach length of the fork 132 received from the cargo handling device information acquisition unit 25 has reached the target reach length received from the target reach length acquisition unit 28. Specifically, the reach length determination unit 29 determines whether or not the reach length of the fork 132 is included in a range of a value obtained by adding or subtracting a predetermined threshold value to the target reach length. The predetermined threshold value, for example, is stored in advance by the storage unit 33.

when the reach length is included in the range, the reach length determination unit 29 determines that "the target reach length is reached". On the other hand, when the reach length is not included in the range, the reach length determination unit 29 determines that "the target reach length is not reached". The reach amount determination unit sends a signal indicating the determination result to the cargo information acquisition unit 22 and the cargo handling device information acquisition unit 25.

(Self-Position Acquisition Unit)

The self-position acquisition unit 30 acquires the position of the forklift 10 based on the data received from the self-position sensor 16. Specifically, the self-position acquisition unit 30 acquires data indicating which position on the traveling route the position of the forklift 10 indicated by the data received from the self-position sensor 16 corresponds to, by referring to the data of the traveling route stored in advance by the storage unit 33. The data is represented by, for example, coordinates of a two-dimensional plane coordinate system. The self-position acquisition unit 30 sends a signal indicating the acquired data to the self-position determination unit 31.

(Self-Position Determination Unit)

The self-position determination unit 31 determines whether or not the forklift 10 has reached the target position P based on the data received from the self-position acquisition unit 30. Specifically, the self-position determination unit 31 determines whether or not the position (coordinates) of the forklift 10 indicated by the data received from the self-position acquisition unit 30 is positioned within a predetermined threshold value range with respect to the coordinates of the target position P stored in advance by the storage unit 33. The threshold value range is represented, for example, by a circle or the like whose center is the target position P and whose radius is a distance on the order of millimeters (mm).

Therefore, when the position of the forklift 10 is positioned within a predetermined threshold value range with respect to the target position P, the self-position determination unit 31 determines that "the target position is reached". On the other hand, when the position of the forklift 10 is positioned outside a predetermined threshold value range with respect to the target position P, the self-position determination unit 31 determines that "the target position is not reached". The threshold value range is stored in advance by the storage unit 33, for example. The self-position determination unit 31 sends a signal indicating the determination result to the cargo handling device information acquisition unit 25.

Here, when the determination result is received from the self-position determination unit 31, and the determination result indicates that "the target position is reached", the cargo handling device information acquisition unit 25 described above acquires the lifting height and the reach length of the fork 132 transmitted from the mast 131.

In addition, the self-position determination unit 31 determines whether or not the stoppable position of the forklift 10 is in front of the target position P based on the allowable acceleration received from the allowable acceleration acquisition unit 26. The term "stoppable position" here means a position at which stoppage is possible when the traveling continues from the position of the forklift 10 acquired from the self-position acquisition unit 30 while the allowable acceleration is applied to the forklift 10 to the backward side Dsb. In addition, the term "front" here means the side of the forklift 10 with respect to the target position P. The self-position determination unit 31, for example, calculates a geometric distance in a two-dimensional plane coordinate system based on the coordinates of the self-position acquired from the self-position acquisition unit 30 and the coordinates of the target position P.

Therefore, when the stoppable position is positioned in front of the target position P, the self-position determination unit 31 determines that "the stoppable position is in front". On the other hand, when the stoppable position is not positioned in front of the target position P, the self-position determination unit 31 determines that "the stoppable position is not in front". The self-position determination unit 31 sends a signal indicating the determination result to the drive wheel control unit 32.

(Drive Wheel Control Unit)

When a signal indicating that the reach-out is completed or a signal indicating that the reach-in is completed is received from the advance and retraction control unit 212, and the determination result received from the self-position determination unit 31 indicates that "the stoppable position is in front", the drive wheel control unit 32 acquires a plurality of torques and drives the drive wheel 141 by using one torque among the plurality of acquired torques. The drive wheel control unit 32 in the present embodiment has a torque acquisition unit 321, a torque decision unit 322, and a drive wheel drive unit 323.

When the determination result received from the self-position determination unit 31 indicates that "the stoppable position is in front", the torque acquisition unit 321 acquires the acceleration torque. The term "acceleration torque" here means, for example, a torque for rotating the drive wheel 141 such that an allowable acceleration is applied to the forklift 10 toward the forward side Dsf. The torque acquisition unit 321 sends a signal indicating the acquired acceleration torque to the torque decision unit 322.

In addition, when the determination result received from the self-position determination unit 31 indicates that "the stoppable position is not in front", the torque acquisition unit 321 acquires the deceleration torque. The term "deceleration torque" here means, for example, a torque for rotating the drive wheel 141 such that the allowable acceleration is applied to the forklift 10 toward the backward side Dsb. The torque acquisition unit 321 sends a signal indicating the acquired deceleration torque to the torque decision unit 322.

In addition, when the acceleration torque or the deceleration torque is acquired or when the determination result of the acceleration determination unit 27 indicates that "the allowable acceleration is equal to or greater than the maximum acceleration", the torque acquisition unit 321 acquires the upper limit torque. The term "upper limit torque" here means the maximum torque among the torques that can be generated by the drive wheel 141. The torque acquisition unit 321 sends a signal indicating the acquired upper limit torque to the torque decision unit 322.

In addition, when the upper limit torque is acquired, the torque acquisition unit 321 acquires an instruction torque. The term "instruction torque" here means a torque decided by the PID control unit (not represented) of the travel control device 20 that can acquire a difference between the position of the forklift 10 and the target position P, a differential value of the difference, or the like. Therefore, the torque acquisition unit 321 acquires the instruction torque from the PID control unit. The torque acquisition unit 321 sends a signal indicating the acquired instruction torque to the torque decision unit 322.

The torque decision unit 322 decides the torque used for driving the drive wheel 141 from each torque acquired by the torque acquisition unit 321. Specifically, the torque decision unit 322 decides the smallest torque among the magnitude of the acceleration torque or the deceleration torque, the magnitude of the upper limit torque, and the magnitude of the instruction torque, as the torque used for driving the drive wheel 141. The torque decision unit 322 sends a signal indicating the decided torque used for driving to the drive wheel drive unit 323.

The drive wheel drive unit 323 rotates the drive wheel 141 with the torque received from the torque decision unit 322. Specifically, the drive wheel drive unit 323 drives the drive wheel 141 by transmitting a signal indicating the torque received from the torque decision unit 322 to the drive motor 141*b* of the drive wheel 141.

(Operation of Travel Control Device)

Figure 6:
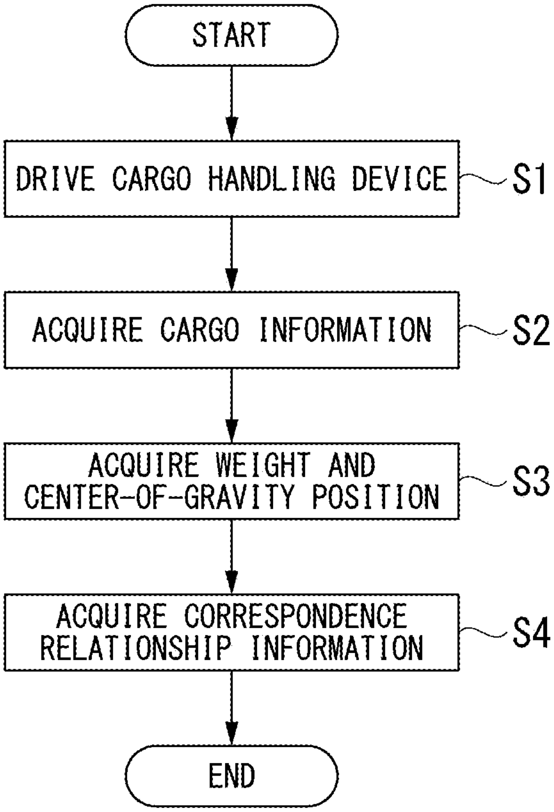
FIG. 6 A flowchart representing an example of an operation of the travel control device according to the first embodiment of the present disclosure.

Subsequently, an example of the operation of the travel control device 20 in the present embodiment will be described with reference to FIG. 6.

When the forklift 10 performs the cargo handling work at the target position P at which the cargo handling work can be performed, the cargo handling device drive unit 21 drives the cargo handling device 13 (step S1). The cargo handling device drive unit 21 causes the cargo handling device 13 to sequentially perform a lift operation (lift-down or lift-up), a reach-out of a reach operation, a lift-up of the lift operation, a reach-in of the reach operation, a lift-down of the lift operation, and a tilt-up and a tilt-down of a tilt operation. In this case, in the reach-in, the mast 131 is driven in the traveling direction Ds such that the fork 132 is disposed on the most forward side Dsf. In addition, in the lift-down, the mast 131 is driven in the vertical direction Dv such that the fork 132 is disposed on the most downward side Dvd.

When the cargo handling device drive unit 21 drives the cargo handling device 13 and the cargo Lg is placed on the fork 132, the cargo information acquisition unit 22 acquires the cargo information (step S2). Specifically, the center-of-gravity position detection unit 232 of the cargo information acquisition unit 22 detects the center-of-gravity position CG1 of the cargo Lg in the vehicle width direction Dw before the mast 131 is tilted up, and the center-of-gravity position detection unit 232 detects the center-of-gravity position CG1 of the cargo Lg in the traveling direction Ds when the mast 131 is tilted up.

Next, the vehicle information acquisition unit 23 acquires the weight and the center-of-gravity position CG of the forklift 10 including the cargo Lg as the vehicle information (step S3). Next, the correspondence relationship information acquisition unit 24 acquires the correspondence relationship information (step S4).

The processing of the step S1 to the step S4 described above is repeatedly performed during the operation of the forklift 10 (during the operation of the movement control system 1).

Figure 7:
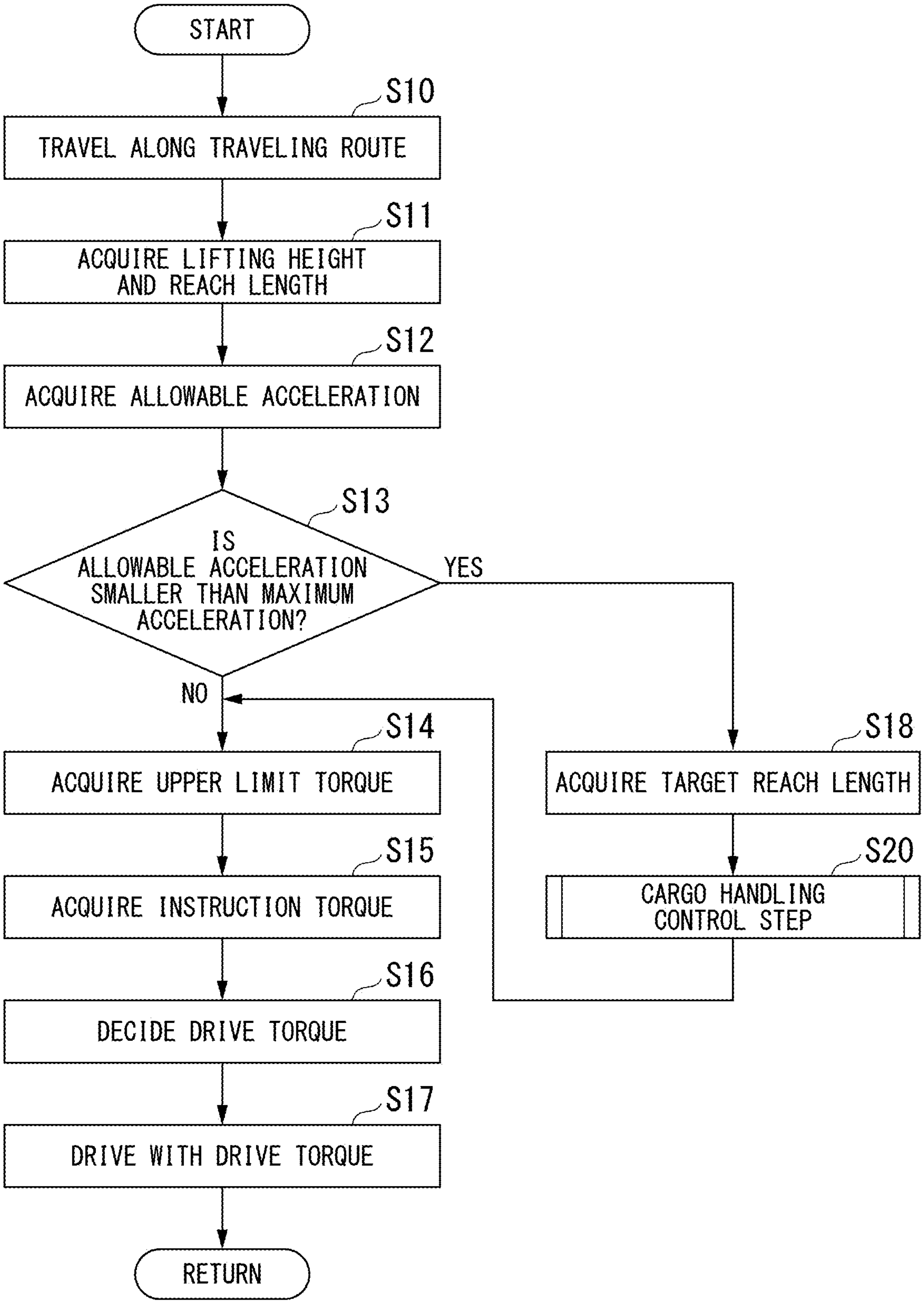
FIG. 7 A flowchart representing an example of an operation of the travel control device according to the first embodiment of the present disclosure.

Subsequently, an example of the operation of the travel control device 20 after the correspondence relationship information is acquired will be described with reference to FIG. 7.

First, the drive wheel drive unit 323 of the drive wheel control unit 32 causes the forklift 10 to travel along the traveling route by driving the drive wheel 141 (step S10). The cargo handling device information acquisition unit 25 acquires the lifting height and the reach length of the fork 132 when the forklift 10 travels (step S11).

Next, the allowable acceleration acquisition unit 26 acquires the allowable acceleration from the correspondence relationship information acquired by the correspondence relationship information acquisition unit 24 based on the lifting height and the reach length of the fork 132 acquired by the cargo handling device information acquisition unit 25 (step S12).

Next, the acceleration determination unit 27 determines whether or not the magnitude of the allowable acceleration acquired by the allowable acceleration acquisition unit 26 is smaller than the magnitude of the maximum acceleration of the forklift 10 (step S13). When the acceleration determination unit 27 determines that "the allowable acceleration is equal to or greater than the maximum acceleration" (step S13: NO), the torque acquisition unit 321 of the drive wheel control unit 32 acquires the upper limit torque (step S14). On the other hand, when the acceleration determination unit 27 determines that "the allowable acceleration is less than the maximum acceleration" (step S13: YES), the target reach length acquisition unit 28 acquires the target reach length of the fork 132 corresponding to the acquired allowable acceleration from the correspondence relationship information (step S18).

Figure 8:
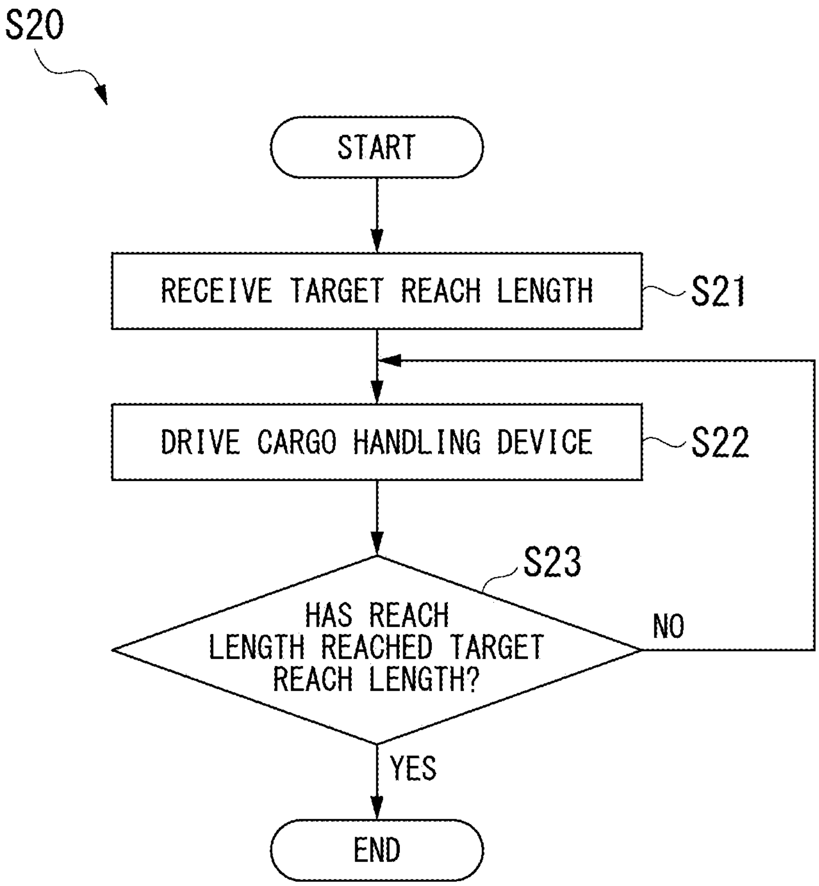
FIG. 8 A flowchart representing an example of a cargo handling control step in the operation of the travel control device according to the first embodiment of the present disclosure.
Figure 9:
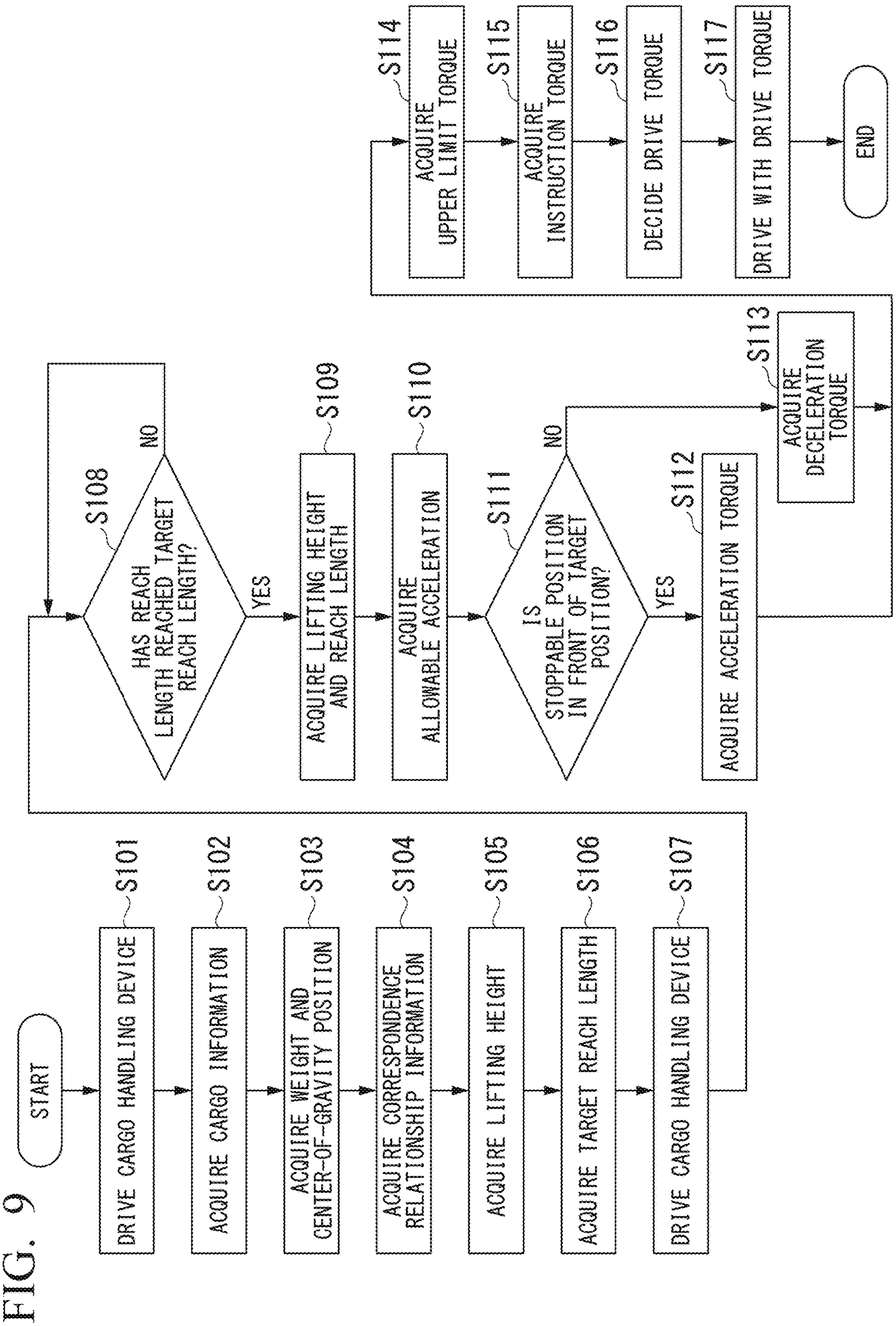
FIG. 9 A flowchart representing an example of an operation of a travel control device according to the second embodiment of the present disclosure.

After the processing of the step S18, a cargo handling control step S20 is performed. As represented in FIG. 8, in the cargo handling control step S20, first, the cargo handling device drive unit 21 receives the target reach length from the target reach length acquisition unit 28 (step S21). Next, the advance and retraction control unit 212 of the cargo handling device drive unit 21 drives the mast 131 by transmitting a signal indicating an instruction of the reach operation based on the target reach length to the mast 131 of the cargo handling device 13 (step S22).

Next, the reach length determination unit 29 determines whether or not the reach length of the fork 132 has reached the target reach length (step S23). When the reach length determination unit 29 determines that "the target reach length is reached" (step S23: YES), the cargo handling control step S20 is completed. After the cargo handling control step S20 is completed, the step S14 described above is performed. On the other hand, when the reach length determination unit 29 determines that "the target reach length is not reached" (step S23: NO), the processing returns to the step S22.

Returning to FIG. 7, after the processing of the step S14, the torque acquisition unit 321 acquires the instruction torque (step S15). Next, the torque decision unit 322 of the drive wheel control unit 32 decides a drive torque (step S16). Next, the drive wheel drive unit 323 of the drive wheel control unit 32 drives the drive wheel 141 with the drive torque decided by the torque decision unit 322 (step S17).

The processing of the step S10 to the step S18 and the step S20 described above is repeatedly performed during the operation of the forklift 10 (during the operation of the movement control system 1).

(Operation and Effect)

According to the above, the allowable acceleration is acquired from the correspondence relationship information based on the lifting height and the reach length of the cargo handling device 13 of the traveling forklift 10. Further, when the magnitude of the acquired allowable acceleration is smaller than the magnitude of the maximum acceleration, the reach length is set to a target reach length corresponding to the allowable acceleration, and the forklift 10 is accelerated at an acceleration greater than the initial allowable acceleration before the reach length is changed. Therefore, the zero moment point Zmp can be moved in the traveling direction Ds as compared with a case where the fork 132 does not protrude, and as a result, the forklift 10 can be moved with a greater acceleration. Therefore, the throughput can be improved while the forklift 10 is suppressed from falling down.

Second Embodiment

Next, the second embodiment of the operation of the travel control device 20 according to the present disclosure will be described with reference to FIG. 8.

(Operation of Travel Control Device)

When the forklift 10 performs the cargo handling work at the target position P at which the cargo handling work can be performed, the cargo handling device drive unit 21 drives the cargo handling device 13 (step S101). Specifically, the cargo handling device drive unit 21 causes the cargo handling device 13 to sequentially perform a lift operation (lift-down or lift-up), a reach-out of a reach operation, a lift-up of the lift operation, and a tilt-up and a tilt-down of a tilt operation. Therefore, in the processing of the step S101 in the present embodiment, the reach-in and the lift-down are not performed by the cargo handling device drive unit 21.

When the cargo handling device drive unit 21 drives the cargo handling device 13 and the cargo Lg is placed on the fork 132, the cargo information acquisition unit 22 acquires the cargo information (step S102). Specifically, the center-of-gravity position detection unit 232 of the cargo information acquisition unit 22 detects the center-of-gravity position CG1 of the cargo Lg in the vehicle width direction Dw before the mast 131 is tilted up, and the center-of-gravity position detection unit 232 detects the center-of-gravity position CG1 of the cargo Lg in the traveling direction Ds when the mast 131 is tilted up.

Next, the vehicle information acquisition unit 23 acquires the weight and the center-of-gravity position CG of the forklift 10 including the cargo Lg as the vehicle information (step S103). Next, the correspondence relationship information acquisition unit 24 acquires the correspondence relationship information (step S104).

Next, the cargo handling device information acquisition unit 25 acquires the lifting height of the fork 132 (step S105). Next, the target reach length acquisition unit 28 acquires the target reach length from the correspondence relationship information acquired by the correspondence relationship information acquisition unit 24 based on the lifting height of the fork 132 acquired by the cargo handling device information acquisition unit 25 and the maximum acceleration of the forklift 10 stored in advance in the storage unit 33 (step S106).

Next, the cargo handling device drive unit 21 drives the cargo handling device 13 (step S107). Specifically, the advance and retraction control unit 212 of the cargo handling device drive unit 21 causes the cargo handling device 13 to perform reach-in, and the ascending and descending control unit 211 of the cargo handling device drive unit 21 causes the cargo handling device 13 to perform lift-down. In this case, in the reach-in, the mast 131 is driven such that the position of the fork 132 is the target reach length.

Next, the reach length determination unit 29 determines whether or not the reach length of the fork 132 has reached the target reach length (step S108). When the reach length determination unit 29 determines that "the target reach length is reached" (step S108: YES), the cargo handling device information acquisition unit 25 acquires the lifting height and the reach length of the fork 132 (step S109). In this case, the reach length of the fork 132 acquired by the cargo handling device information acquisition unit 25 is the target reach length acquired by the target reach length acquisition unit 28 in the step S106. On the other hand, when the reach length determination unit 29 determines that "the target reach length is not reached" (step S108: NO), the processing returns to the step S107.

Next, the allowable acceleration acquisition unit 26 acquires the allowable acceleration from the correspondence relationship information acquired by the correspondence relationship information acquisition unit 24 based on the lifting height and the reach length of the fork 132 acquired by the cargo handling device information acquisition unit 25 (step S110).

Next, the self-position determination unit 31 determines whether or not the stoppable position of the forklift 10 is in front of the next target position P (step S111). When the self-position determination unit 31 determines that "the stoppable position is in front" (step S111: YES), the torque acquisition unit 321 acquires the acceleration torque (step S112). On the other hand, when the self-position determination unit 31 determines that "the stoppable position is not in front" (step S111: NO), the torque acquisition unit 321 acquires the deceleration torque (step S113). When the processing of step S27 and step S28 is finished, the torque acquisition unit 321 of the drive wheel control unit 32 acquires the upper limit torque (step S114).

Next, the torque acquisition unit 321 acquires the instruction torque (step S115). Next, the torque decision unit 322 of the drive wheel control unit 32 decides the drive torque (step S116). Next, the drive wheel drive unit 323 of the drive wheel control unit 32 drives the drive wheel 141 with the drive torque decided by the torque decision unit 322 (step S117).

The processing of the step S101 to the step S117 described above is repeatedly performed during the operation of the forklift 10 (during the operation of the movement control system 1).

(Operation and Effect)

According to the above, when the forklift 10 performs the cargo handling work at the target position P, the target reach length is acquired from the correspondence relationship information based on the lifting height of the fork 132 and the maximum acceleration of the forklift 10. Further, the protrusion amount of the fork 132 is set to the target reach length, the allowable acceleration is acquired from the correspondence relationship information based on the lifting height of the fork 132 and the target reach length, and the forklift 10 is moved at the allowable acceleration. As a result, for example, the forklift 10 can be moved toward the next target position P with a greater acceleration than in a case where the forklift 10 travels in a state in which the fork 132 does not protrude. Therefore, the throughput can be improved while the forklift 10 is suppressed from falling down.

Other Embodiments

As described above, the embodiments of the present disclosure have been described in detail with reference to the drawings. However, the specific configuration is not limited to the configurations in the embodiments and addition, omission, substitution, and other modifications can be made within a scope which does not depart from the gist of the present disclosure.

Figure 10:
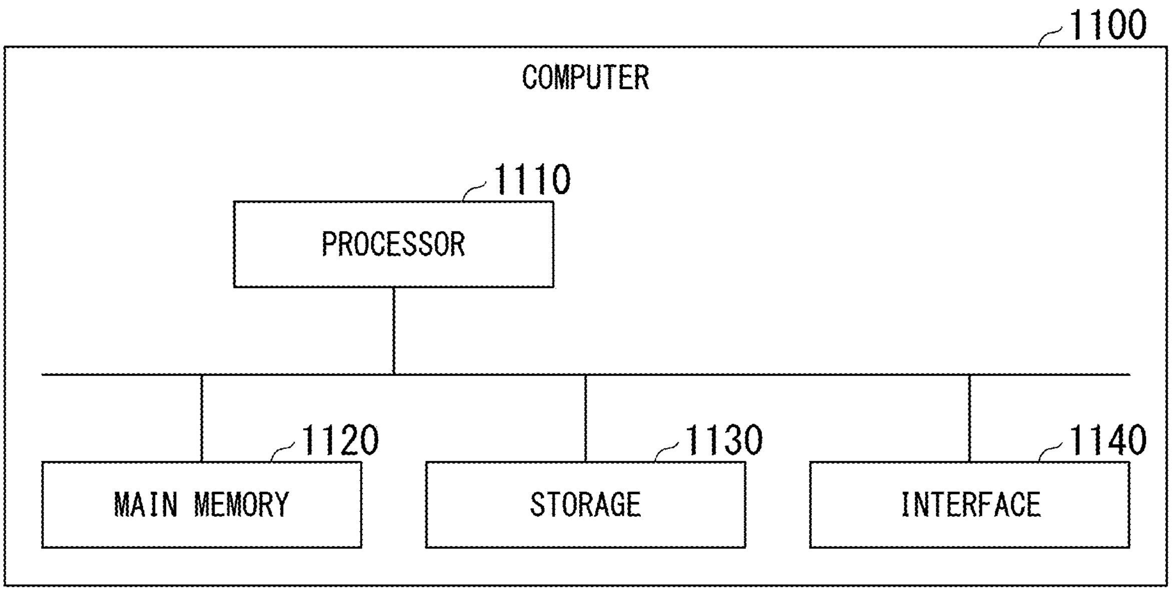
FIG. 10 A hardware configuration diagram representing the configuration of a computer according to an embodiment of the present disclosure.

FIG. 10 is a hardware configuration diagram representing the configuration of a computer 1100 according to the present embodiment.

The computer 1100 includes a processor 1110, a main memory 1120, a storage 1130, and an interface 1140.

The travel control device 20 described above is mounted on the computer 1100. Then, an operation of each processing unit described above is stored in the storage 1130 in a form of a program. The processor 1110 reads a program from the storage 1130, deploys the program on the main memory 1120, and executes the above-described processing according to the program. In addition, the processor 1110 secures a storage area corresponding to the storage unit 33 described above in the main memory 1120 according to the program.

The program may be for realizing part of the functions that the computer 1100 is caused to exhibit. For example, the program may function in combination with another program stored in the storage 1130 in advance or in combination with another program installed in another device.

In addition, the computer 1100 may include a custom large scale integrated circuit (LSI) such as a programmable logic device (PLD) in addition to or instead of the above-described configuration. Examples of the PLD include a programmable array logic (PAL), a generic array logic (GAL), a complex programmable logic device (CPLD), and a field programmable gate array (FPGA). In this case, part or all of the functions realized by the processor 1110 may be realized by the integrated circuit.

Examples of the storage 1130 include a magnetic disk, a magneto-optical disk, a semiconductor memory, or the like. The storage 1130 may be an internal medium directly connected to a bus of the computer 1100 and may be an external medium connected to the computer 1100 via the interface 1140 or a communication line.

In addition, when such a program is transmitted to the computer 1100 via a communication line, the computer 1100 receiving the transmission may deploy the program on the main memory 1120 and execute the above-described processing. In the above-described embodiment, the storage 1130 is a non-transitory tangible storage medium.

In addition, the program may be for realizing part of the above-described functions. Furthermore, the program may be a so-called difference file (a difference program) that realizes the above-described functions in combination with another program stored in the storage 1130 in advance.

In addition, in the correspondence relationship information acquired by the correspondence relationship information acquisition unit 24, the lifting height of the fork 132, the reach length of the fork 132, and the revolution speed at which the zero moment point Zmp is positioned within the stable region R1 may be associated with each other. In this case, the allowable acceleration acquisition unit 26 acquires the allowable revolution speed from the correspondence relationship information acquired by the correspondence relationship information acquisition unit 24 based on the lifting height and the reach length of the fork 132 acquired by the cargo handling device information acquisition unit 25.

Figure 11:
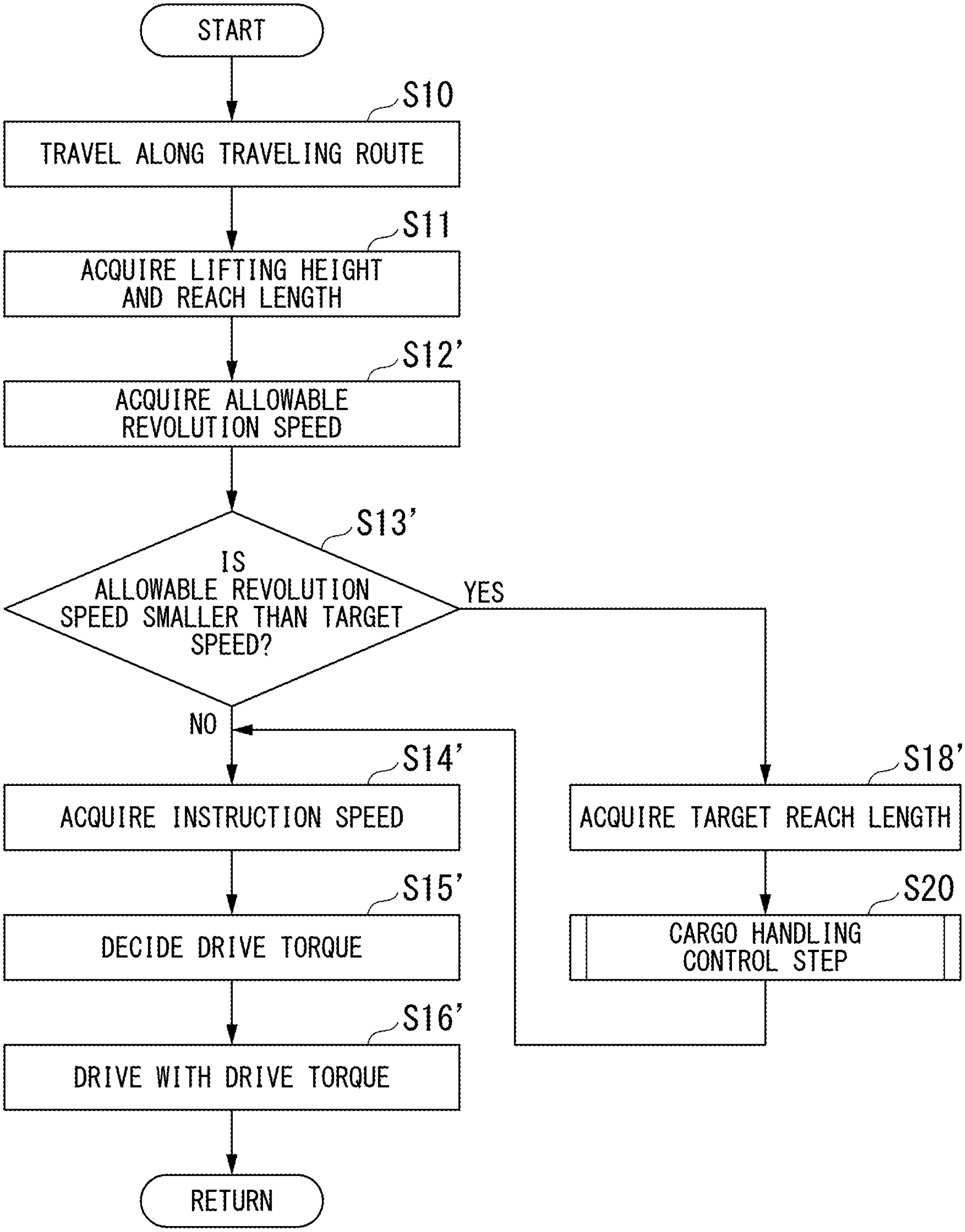
FIG. 11 A flowchart representing an example of an operation of a travel control device according to another embodiment of the present disclosure.

Hereinafter, an example of an operation of the travel control device 20 after the correspondence relationship information is acquired will be described with reference to FIG. 11.

First, the drive wheel drive unit 323 of the drive wheel control unit 32 causes the forklift 10 to travel along the traveling route by driving the drive wheel 141 (step S10). The cargo handling device information acquisition unit 25 acquires the lifting height and the reach length of the fork 132 when the forklift 10 travels (step S11).

Next, the allowable acceleration acquisition unit 26 acquires the allowable revolution speed from the correspondence relationship information acquired by the correspondence relationship information acquisition unit 24 based on the lifting height and the reach length of the fork 132 acquired by the cargo handling device information acquisition unit 25 (step S12').

Next, the acceleration determination unit 27 determines whether or not the magnitude of the allowable revolution speed acquired by the allowable acceleration acquisition unit 26 is smaller than the magnitude of the target speed of the forklift 10 (step S13'). The term "magnitude of the target speed of the forklift 10" here means, for example, a magnitude of a revolution speed applied to the forklift 10 when the drive motor 141*b* is rotated at the maximum torque among the torques that can be generated by the drive wheel 141 in a state where the cargo Lg is not placed on the fork 132. The target speed is an example of the maximum acceleration of the forklift 10 and, for example, is stored in advance by the storage unit 33.

When the acceleration determination unit 27 determines that "the allowable revolution speed is equal to or greater than the target speed" (step S13': NO), the torque acquisition unit 321 of the drive wheel control unit 32 acquires an instruction speed (step S14'). The torque acquisition unit 321 acquires, as the instruction speed, the smaller speed between the magnitude of the allowable revolution speed and the magnitude of the target speed.

On the other hand, when the acceleration determination unit 27 determines that "the allowable revolution speed is less than the target speed" (step S13': YES), the target reach length acquisition unit 28 acquires the target reach length of the fork 132 corresponding to the acquired allowable revolution speed from the correspondence relationship information (step S18'). After the processing of the step S18', the cargo handling control step S20 described above is performed.

After the processing of the step S14', the torque decision unit 322 of the drive wheel control unit 32 decides the drive torque (step S15'). The torque decision unit 322 decides the drive torque from the standard deviation of the instruction speed acquired by the torque acquisition unit 321. Next, the drive wheel drive unit 323 of the drive wheel control unit 32 drives the drive wheel 141 with the drive torque decided by the torque decision unit 322 (step S16').

The series of processing described above is repeatedly performed during the operation of the forklift 10 (during the operation of the movement control system 1).

In addition, when the target position P described in the first embodiment is a position at which the forklift 10 can load the cargo Lg, the lifting height and the reach length of the fork 132 in the forklift 10 that travels in a state where the cargo Lg is not placed may be a height and a protrusion amount at which the cargo Lg can be loaded. As a result, for example, the time required for driving the cargo handling device 13 at the target position P can be shortened. Therefore, it is possible to shorten the time required for the cargo handling work and to further improve the throughput.

In addition, the operation of the travel control device 20 described in each of the above-described embodiments are not limited to each independent configuration, and the operations of the travel control device 20 may be configured by appropriately combining the operations described in each of the embodiments.

APPENDIX

The travel control device described in the embodiment is understood as follows, for example.

(1) There is provided a travel control device 20 of a forklift 10 according to a first aspect including a vehicle 11, a drive wheel 141 that is provided on the vehicle 11 and that causes the vehicle 11 to travel by being driven, a straddle leg 12 that is provided on the vehicle 11 and is configured to travel together with the vehicle 11, and a cargo handling device 13 that is provided on the straddle leg 12 and is driven such that a fork 132 is configured to ascend and descend in a vertical direction Dv and configured to move forward and backward in a traveling direction Ds of the vehicle 11, the travel control device 20 including a center-of-gravity position detection unit 232 configured to detect a center-of-gravity position CG of the forklift 10 including a cargo Lg when the cargo Lg is placed on the fork 132, a correspondence relationship information acquisition unit 24 configured to acquire correspondence relationship information in which a lifting height indicating a position of the fork 132 in the vertical direction Dv, a reach length indicating a protrusion amount of the fork 132 in the traveling direction Ds, and an acceleration for positioning a zero moment point Zmp in a stable region R1 are associated with each other, based on the center-of-gravity position CG, a cargo handling device information acquisition unit 25 configured to acquire the lifting height and the reach length of the fork 132, an allowable acceleration acquisition unit 26 configured to acquire an allowable acceleration from the correspondence relationship information based on the lifting height and the reach length acquired by the cargo handling device information acquisition unit 25, a target reach length acquisition unit 28 configured to acquire a target reach length from the correspondence relationship information based on the lifting height and a maximum acceleration when the allowable acceleration is less than the maximum acceleration of the forklift 10, a cargo handling device drive unit 21 configured to drive the cargo handling device 13 such that the reach length of the fork 132 is the target reach length, and a drive wheel control unit 32 configured to drive the drive wheel 141 such that the forklift 10 is accelerated at an acceleration greater than the allowable acceleration when the reach length of the fork 132 is the target reach length.

Accordingly, the allowable acceleration is acquired based on the lifting height and the reach length of the cargo handling device 13 of the traveling forklift 10, and when the magnitude of the allowable acceleration is smaller than the magnitude of the maximum acceleration, the forklift 10 is accelerated at an acceleration greater than the initial allowable acceleration before the reach length is changed when the lifting height and the reach length are set corresponding to the maximum acceleration. Therefore, the forklift 10 can be moved with a greater acceleration.

(2) The travel control device 20 according to a second aspect is the travel control device 20 according to the first aspect, in which the forklift 10 travels toward a target position P that is a cargo handling position in a state where the cargo Lg is not placed on the fork 132, and the lifting height and the reach length of the fork 132 acquired by the cargo handling device information acquisition unit 25 are a height and a protrusion amount at which the cargo Lg is loadable on the fork 132 at the target position P.

As a result, the time required for driving the cargo handling device 13 at the target position P can be shortened. Therefore, it is possible to shorten the time required for the cargo handling work and to further improve the throughput.

(3) There is provided a travel control device 20 of a forklift 10 according to a third aspect including a vehicle 11, a drive wheel 141 that is provided on the vehicle 11 and that causes the vehicle 11 to travel by being driven, a straddle leg 12 that is provided on the vehicle 11 and is configured to travel together with the vehicle 11, and a cargo handling device 13 that is provided on the straddle leg 12 and is driven such that a fork 132 is configured to ascend and descend in a vertical direction Dv and configured to move forward and backward in a traveling direction Ds of the vehicle 11, the travel control device 20 including a center-of-gravity position detection unit 232 configured to detect a center-of-gravity position CG of the forklift 10 including a cargo Lg when the cargo Lg is placed on the fork 132, a correspondence relationship information acquisition unit 24 configured to acquire correspondence relationship information in which a lifting height indicating a position of the fork 132 in the vertical direction Dv, a reach length indicating a protrusion amount of the fork 132 in the traveling direction Ds, and an acceleration for positioning a zero moment point Zmp in a stable region R1 are associated with each other, based on the center-of-gravity position CG, a cargo handling device information acquisition unit 25 configured to acquire the lifting height of the fork 132 when the center-of-gravity position CG of the forklift 10 is detected, a target reach length acquisition unit 28 configured to acquire a target reach length from the correspondence relationship information based on the lifting height of the fork 132 and a maximum acceleration of the forklift 10 acquired by the cargo handling device information acquisition unit 25, a cargo handling device drive unit 21 configured to drive the cargo handling device 13 such that the reach length of the fork 132 is the target reach length, an allowable acceleration acquisition unit 26 configured to acquire an allowable acceleration from the correspondence relationship information based on the lifting height of the fork 132 and the target reach length, and a drive wheel control unit 32 configured to drive the drive wheel 141 such that the forklift 10 is accelerated at the allowable acceleration when the reach length of the fork 132 is the target reach length.

As a result, for example, when the forklift 10 performs the cargo handling work, the target reach length is acquired based on the lifting height of the fork 132 and the maximum acceleration of the forklift 10. Further, when the protrusion amount of the fork 132 is set to the target reach length and the allowable acceleration is acquired based on the lifting height and the target reach length of the fork 132, the forklift 10 is moved at the allowable acceleration. Therefore, for example, the forklift 10 can be moved with a greater acceleration than in a case where the forklift 10 travels in a state in which the fork 132 does not protrude.

REFERENCE SIGNS LIST

1 Movement control system
10 Forklift
11 Vehicle
12 Straddle Leg
13 Cargo handling device
14 Travel mechanism
15 Weight sensor
16 Self-position sensor
20 Travel control device
21 Cargo handling device drive unit
22 Cargo information acquisition unit
23 Vehicle information acquisition unit
24 Correspondence relationship information acquisition unit
25 Cargo handling device information acquisition unit
26 Allowable acceleration acquisition unit
27 Acceleration determination unit
28 Target reach length acquisition unit
29 Reach length determination unit
30 Self-position acquisition unit
31 Self-position determination unit
32 Drive wheel control unit
321 Torque acquisition unit
322 Torque decision unit
323 Drive wheel drive unit
33 Storage unit
40 Higher-level apparatus
121 Right straddle leg
122 Left straddle leg
131 Mast
132 Fork
141 Drive wheel
**141*a*** Drive wheel main body
**141*b*** Drive motor
**141*c*, 142*b*, 143*b*** Steering motor
142 First driven wheel
**142*a*** First driven wheel main body
143 Second driven wheel
**143*a*** Second driven wheel main body
211 Ascending and descending control unit
**211*a*** Lift-down instruction unit
**211*b*** Lift-up instruction unit
212 Advance and retraction control unit
**212*a*** Reach-out instruction unit
**212*b*** Reach-in instruction unit
213 Tilt control unit
**213*a*** Tilt-up instruction unit
**213*b*** Tilt-down instruction unit
221 Cargo load acquisition unit
222 Cargo weight calculation unit
223 Cargo center-of-gravity position detection unit
231 Weight calculation unit
232 Center-of-gravity position detection unit
1100 Computer
1110 Processor
1120 Main memory
1130 Storage
1140 Interface
D1 Passage extension direction
D2 Passage width direction
Ds Traveling direction
Dsb Backward side
Dsf Forward side
Dv Vertical direction
Dvd Downward side
Dvu Upward side
Dw Vehicle width direction
Dwl Second side
Dwr First side
Lg Cargo
O1 First rotation axis line
O2 Second rotation axis line
O3 Third rotation axis line
P Target position
R Road surface
R1 Stable region
R2 Allowable region
V1 First imaginary line
V2 Second imaginary line
V3 Third imaginary line
W Wall body
Zmp Zero moment point

The invention claimed is:

1. A travel control device of a forklift including
a vehicle,
a drive wheel that is provided on the vehicle and that configured to drive the vehicle,
a straddle leg that is provided on the vehicle and is configured to travel together with the vehicle, and
a cargo handling device that is provided on the straddle leg and is driven such that a fork is configured to ascend and descend in a vertical direction and configured to move forward and backward in a traveling direction of the vehicle, the travel control device comprising:
a center-of-gravity position detection unit configured to detect a center-of-gravity position of the forklift including a cargo when the cargo is placed on the fork;
a correspondence relationship information acquisition unit configured to acquire correspondence relationship information in which a lifting height indicating a position of the fork in the vertical direction, a reach length indicating a protrusion amount of the fork in the traveling direction, and an acceleration for positioning a zero moment point in a stable region are associated with each other, based on the center-of-gravity position;
a cargo handling device information acquisition unit configured to acquire the lifting height and the reach length of the fork;
an allowable acceleration acquisition unit configured to acquire an allowable acceleration from the correspondence relationship information based on the lifting height and the reach length acquired by the cargo handling device information acquisition unit;
a target reach length acquisition unit configured to acquire a target reach length from the correspondence relationship information based on the lifting height and a maximum acceleration when the allowable acceleration is less than the maximum acceleration of the forklift;
a cargo handling device drive unit configured to drive the cargo handling device such that the reach length of the fork is the target reach length; and
a drive wheel control unit configured to drive the drive wheel such that the forklift is accelerated at an acceleration greater than the allowable acceleration when the reach length of the fork is the target reach length.

2. The travel control device according to claim 1, wherein the forklift travels toward a target position that is a cargo handling position in a state where the cargo is not placed on the fork, and the lifting height and the reach length of the fork acquired by the cargo handling device information acquisition unit are a height and a protrusion amount at which the cargo is loadable on the fork at the target position.

3. A travel control device of a forklift including a vehicle, a drive wheel that is provided on the vehicle and that configured to drive the vehicle, a straddle leg that is provided on the vehicle and is configured to travel together with the vehicle, and a cargo handling device that is provided on the straddle leg and is driven such that a fork is configured to ascend and descend in a vertical direction and configured to move forward and backward in a traveling direction of the vehicle, the travel control device comprising:

a center-of-gravity position detection unit configured to detect a center-of-gravity position of the forklift including a cargo when the cargo is placed on the fork;

a correspondence relationship information acquisition unit configured to acquire correspondence relationship information in which a lifting height indicating a position of the fork in the vertical direction, a reach length indicating a protrusion amount of the fork in the traveling direction, and an acceleration for positioning a zero moment point in a stable region are associated with each other, based on the center-of-gravity position;

a cargo handling device information acquisition unit configured to acquire the lifting height of the fork when the center-of-gravity position of the forklift is detected;

a target reach length acquisition unit configured to acquire a target reach length from the correspondence relationship information based on the lifting height of the fork and a maximum acceleration of the forklift acquired by the cargo handling device information acquisition unit;

a cargo handling device drive unit configured to drive the cargo handling device such that the reach length of the fork is the target reach length;

an allowable acceleration acquisition unit configured to acquire an allowable acceleration from the correspondence relationship information based on the lifting height of the fork and the target reach length; and a drive wheel control unit configured to drive the drive wheel such that the forklift is accelerated at the allowable acceleration when the reach length of the fork is the target reach length.

* * * * *